(12) United States Patent
Ito et al.

(10) Patent No.: US 6,962,430 B2
(45) Date of Patent: Nov. 8, 2005

(54) PANEL LIGHT SOURCE DEVICE AND DISPLAY DEVICE

(75) Inventors: Atsushi Ito, Kumamoto (JP); Masayuki Kawano, Kumamoto (JP)

(73) Assignee: Advanced Display Inc., Kumamoto (JP)

( * ) Notice: Subject to any disclaimer, the term of this patent is extended or adjusted under 35 U.S.C. 154(b) by 0 days.

(21) Appl. No.: 10/392,040

(22) Filed: Mar. 19, 2003

(65) Prior Publication Data

US 2003/0179580 A1 Sep. 25, 2003

(30) Foreign Application Priority Data

Mar. 20, 2002 (JP) .............................. 2002-079165
Jul. 31, 2002 (JP) .............................. 2002-222965

(51) Int. Cl.[7] .............................. F21V 7/10; F21V 15/01
(52) U.S. Cl. ...................... 362/634; 362/306; 362/609
(58) Field of Search .............................. 349/58–60, 65, 349/67; 362/31, 308, 307, 330, 561, 306, 362/609, 624, 632, 633, 634

(56) References Cited

U.S. PATENT DOCUMENTS

| | | | | | |
|---|---|---|---|---|---|
| 5,046,826 | A | * | 9/1991 | Iwamoto et al. | 349/65 |
| 5,064,276 | A | * | 11/1991 | Endo et al. | 349/65 |
| 5,207,493 | A | * | 5/1993 | Murase et al. | 362/31 |
| 5,280,372 | A | * | 1/1994 | Horiuchi | 349/65 |
| 5,335,100 | A | * | 8/1994 | Obata | 349/65 |
| 5,966,191 | A | * | 10/1999 | Lee | 349/58 |
| 6,016,175 | A | * | 1/2000 | Kim | 349/58 |
| 6,295,105 | B1 | * | 9/2001 | Lee et al. | 349/65 |
| 6,330,148 | B1 | * | 12/2001 | Won et al. | 349/58 |
| 6,525,789 | B1 | * | 2/2003 | Lee | 349/58 |

FOREIGN PATENT DOCUMENTS

| | | |
|---|---|---|
| JP | 2000-315 414 | 11/2000 |
| JP | 2001-250 416 | 9/2001 |

OTHER PUBLICATIONS

Patent Abstracts of Japan, English abstract of JP 2000-315 414 publ. Nov. 14, 2000.
Patent Abstracts of Japan, English abstract of JP 2001-250 416 publ. Sep. 14, 2001.

* cited by examiner

Primary Examiner—Alan Cariaso
(74) Attorney, Agent, or Firm—Milton Oliver, Esq.; Ware Fressola Van Der Sluys & Adolphson LLP

(57) ABSTRACT

A panel light source device has a construction which not only prevents a gap or clearance between a reflecting sheet 5 and a light guide plate 1 from occurring, but also improves the luminance and uniformity of a light emitting surface, at a low cost. A panel light source device includes a light guide plate 1 on a front face of which an optical sheet 2 is provided, a light emitter 3 to cause light to enter a side face of the light guide plate 1, a reflecting sheet 5, provided facing a rear face of the light guide plate 1, and an end of which extends around the light emitter 3 to reach the front face of the light guide plate, and a case 6, not only housing the light guide plate 1, the light emitter 3 and the reflecting sheet 5, but also equipped with a reflecting sheet contact section 20, causing part of a front face thereof to recede toward a rear face side thereof, to bring the part of a front face thereof into contact with the reflecting sheet 5.

11 Claims, 18 Drawing Sheets

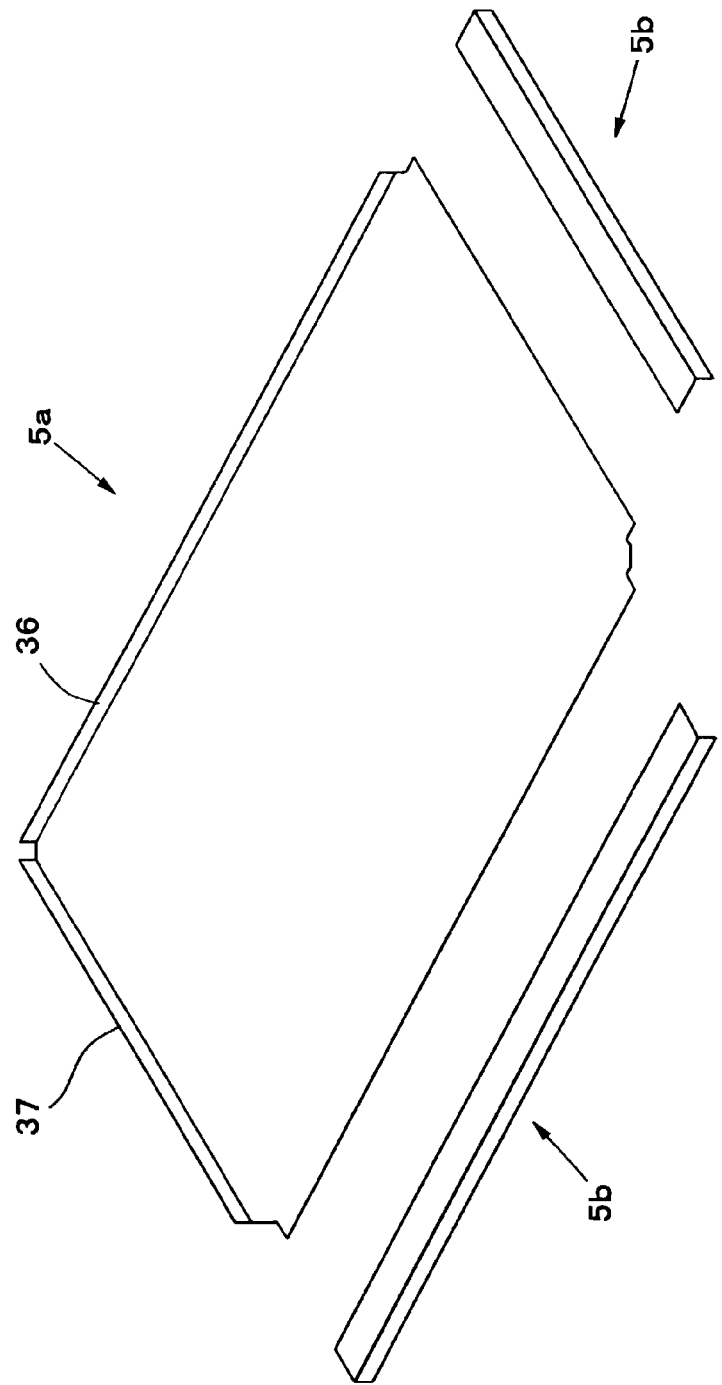

PANEL LIGHT SOURCE DEVICE AND DISPLAY DEVICE

BACKGROUND OF THE INVENTION

1. Field of the Invention

The present invention relates to a panel light source device and a display device, and more particularly to improvement on a panel light source device, which are used in a display device for presenting letters, an image and others thereon, for example, a liquid crystal display device, and on a display device including this panel light source device.

2. Description of the Related Art

A liquid crystal display device has features such as being slim, light, low in power consumption and others in comparison with other kinds of displays, and has been widely used as displays for use in various applications such as those starting with a computer, followed by portable terminals including a portable telephone, a car navigation terminal and others. In a case of a liquid crystal display device, since a liquid crystal panel on which image information on each pixel is reproduced does not emit light by itself, a light source device is required additionally, so that a liquid crystal display device is commonly equipped with a light source device called a back light device emitting light at a rear face side of a liquid crystal panel.

In such a display, since there is necessity that a display region for an image or the like is illuminated uniformly by light, there has been a demand for a panel light source device, having a light emitting surface corresponding to the display region, and being excellent in uniformity of a light emitting characteristic on the light emitting surface. Furthermore, a request has been made for downsizing and weight reduction of the light source device in order to realize downsizing and weight reduction of the light display device as a whole. For this reason, in this kind of a light source device, a side light type has been commonly adopted in which a linear shaped light emitter is disposed at the side-face side of a light guide plate.

FIG. 1 is a sectional view showing an example construction of a conventional panel light source device, showing a back light device for a liquid crystal display device adopting a side light type. In the figure, a numerical reference 1 indicates a light guide plate, 2 an optical sheet, 3 a light emitter, 4 a wire, 5 a reflecting sheet, 6 a front face case, 7 a rear face case and 12 an opening section. The constituents 1 to 5 are housed in a composite case formed by engaging the front face case 6 and the rear face case 7 with each other to construct a panel light source device and a liquid crystal panel is mounted outside the opening section 12 in a case of a liquid crystal display device.

In order to realize downsizing and weight reduction of the light source device, the reflecting sheet 5 is provided not only on the rear face side of the light guide plate 1, but also used as a lamp reflector obtained by bending an end portion into the shape of a Greek letter Π open sideways. Light emitted from the light emitter 3 strikes an light incident face provided at a side face of the light guide plate 1 to advance in the light guide plate 1 and exits from the front face (the optical sheet 2 side) thereof. The light leaving the front face is emitted through the opening section 12 through the optical sheet 2. That is, the opening section 12 works as a light emitting surface.

In a case where a clearance is present between the reflecting sheet 5 and the light guiding plate 1, since the emitting light from the light emitter 3 leaks through the clearance, part of the light is not used effectively, so that a luminance on the light emitting surface is reduced. Furthermore, light evaded from the clearance becomes stray light and the stray light appearing on the light emitting surface causes luminance irregularity of the light source device, having led, in turn, to a problem of display irregularity when such a light source device is adopted in a liquid crystal display device. Since this kind of display irregularity is extremely severe, a light source device with such a problem could not be used as a panel light source without an improvement thereon. Therefore, while a prior art light source device of this kind was provided with a print 13 for absorption of light on part of the optical sheet 2, the print 13 caused cost-up and further, became an factor of reduction in luminance.

Moreover, when an external force is imposed on the front face of the front face case 6, the front face case 6 is deformed to press the optical sheet 2 toward the light guide plate 1 side, so that a problem has arisen that a display quality is greatly degraded. Especially in a case of a liquid crystal display device, a liquid crystal panel is mounted onto the front face case 6, so that a force is imposed on the front case 6 with ease, which has adversely influenced a display quality.

FIG. 2 is a sectional view showing an example construction of another prior panel light source device, showing a device disclosed in Japanese Unexamined Patent Publication No. 2000-315414. In the figure, a numerical reference 1 indicate a light guide plate, 3 a light emitter, 5 a reflecting sheet, 8 a double-sided tape, 9 is a case and 10 a liquid crystal panel.

In this panel light source device, not only does an end portion of the reflecting sheet 5 overlap the front face of the light guide plate 1, but the overlapping portion thereof is firmly fixed to the front face of the light guide plate 1 with the double-sided tape 8. If a material strong in restoring force against bending is used as that of the reflecting sheet 5, it is not easy to suppressing occurrence of a clearance with the double-sided tape 8. In addition, the double-sided tape 8 adhered to the light guide plate 1 causes unexpected reflection in the light guide plate 1 to disable uniform luminance on the light emitting surface, having again resulted in a problem of reduction in luminance.

The light guide plate 1 total-reflects incident light based on a difference in refractive index between the material thereof (acrylic resin and the like) and air, not only to confine the light within the light guide 1 but also to scatter the confined light with a pattern formed on the rear face thereof and to thereby cause the confined light to leave from the front face. For this reason, reflection different from total reflection arises in part of the light guide plate 1 to the surface of which the double-sided tape 8 is adhered. Since light reflected at an angle different from the case of the total reflection is emitted from an unexpected location on the light guide plate 1, a problem has arisen that a kind of treatment (print 13) for absorbing the light is necessary to be applied on part of the optical sheet 2 similarly to the case in FIG. 1.

On the other hand, FIG. 3 is a sectional view showing an example construction of still another prior art panel light source device, showing a device disclosed in Japanese Unexamined Patent Publication No. 2001-250416. In the figure, a numerical reference 1 indicates a light guide plate, 3 a light emitter, 4 a wire, 5 a reflecting sheet, 6 a front face case, 7 a rear face case and 11, 14 a double-sided tape.

The double-sided tape 14 fixedly adheres the reflecting sheet 5 to the case 6 for the purpose of preventing dust from invading the interior of the optical source device from the external environment. For this reason, a problem has arisen that a clearance is easy to occur between the reflecting sheet 5 and the light guiding plate 1. Furthermore, since the optical sheet 2 is overlapped on the reflecting sheet 5, a force externally imposed on the case 6 is transmitted to the optical sheet 2 to degrade a display quality.

Since conventional panel light source devices were constructed as described above, a clearance between a reflecting sheet 5 and a light guide plate 1, if any, caused a problem of reduction in luminance on a light emitting surface or luminance irregularity on a light emitting surface, which required printing on a optical sheet 2 in order to suppress such adverse influences. In addition, when a force was imposed on a case, the case in turn pressed the optical sheet 2 to thereby, greatly degrade a display quality.

SUMMARY OF THE INVENTION

It is an object of the present invention to provide a panel light source device having a construction preventing or suppressing a clearance between a reflecting sheet and a light guide plate from occurring. It is another object of the present invention to provide a panel light source device having a construction preventing or suppressing a misregistration between a reflecting sheet and a light guide plate from occurring. It is still another object of the present invention to provide a panel light source device having a construction in which an external force is hard to be transmitted to an optical sheet. It is yet another object of the present invention to provide the panel light source devices at a low cost. It is yet another object of the present invention to provide a display equipped with any of the panel light source devices.

A panel light source device according to the present invention includes: a light guide plate on a front face of which an optical sheet is provided; a light emitter to cause light to strike a side face of the light guide plate; a reflecting sheet, provided facing a rear face of the light guide plate, and an end of which wraps the light emitter to reach the front face thereof; and a case, not only housing the light guide plate, the light emitter and the reflecting sheet, but also equipped with a reflecting sheet contact section causing part of a front face thereof to retreat toward a rear face side thereof to bring the part of a front face thereof into contact with the reflecting sheet. With such a construction adopted, the reflecting sheet is pressed to the light guide plate to enable a clearance between the reflecting sheet and the light guide plate to be prevented from occurring.

Further, a panel light source device according to the present invention is of a construction in which the reflecting sheet is arranged without overlapping the optical sheet and the reflecting sheet contact section is brought into contact with the reflecting sheet on the light guide plate. With such a construction adopted, a force from outside of a case is imposed on the reflecting sheet through the reflecting sheet contact section without imposing the force on the optical sheet.

Further, a panel light source device according to the present invention includes: a light guide plate on a front face of which an optical sheet is provided; a light emitter to cause light to strike a side face of the light guide plate; a reflecting sheet, provided facing a rear face of the light guide plate, and an end of which wraps the light emitter; and a case, not only housing the light guide plate, the light emitter and the reflecting sheet, but also equipped with a reflecting sheet contact section causing part of a wall face thereof to protrude toward inside thereof to bring the part of a wall face thereof into contact with the reflecting sheet. With such a construction adopted, the reflecting sheet is pressed to the light guide plate to enable a clearance between the reflecting sheet and the light guide plate to be prevented from occurring.

Further, a panel light source device according to the present invention is of a construction in which the reflecting sheet contact section is provided on a rear face of the case. With the reflecting sheet contact section provided on the rear face of the case, it can be prevented that a clearance arises between the reflecting sheet and the light guide plate on the rear face side of the light guide plate. In addition, a movement of the reflecting sheet in the case can be suppressed.

Further, a panel light source device according to the present invention is of a construction in which reflecting sheet contact sections are provided on the front face and rear face of the case. With the reflecting sheet contact sections provided on both of the front and rear faces of the case, it can be prevented that clearances arise between the reflecting sheet and the light guide plate on both of the front and rear sides of the light guide plate.

Further, a panel light source device according to the present invention is of a construction in which the reflecting sheet includes: a first reflecting sheet facing the rear face of the light guide plate and a second reflecting sheet wrapping the light emitter in corporation with an end of the first reflecting sheet. With such a construction adopted, since the first reflecting sheet and the second reflecting sheets are separate, assembly of the device is easy.

Further, a panel light source device according to the present invention is of a construction in which the reflecting sheet contact section is brought into contact with the reflecting sheet in the light emitter side spaced apart from the light guide plate to hold the reflecting sheet by the reflecting sheet contact section and the light guide plate sandwiching therebetween. When a material with a strong restoring force against a bending pressure such as a resin sheet is used as a material of the reflecting sheet, the reflecting sheet can be held by the reflecting sheet contact section and the light guide plate sandwiching therebetween even if the reflecting sheet contact section is brought into contact with the reflecting sheet in an outer side apart from the light guide plate. Therefore, a movement of the reflecting sheet in the case can be suppressed. In addition, a width of an outer peripheral portion in the front face of the case can be narrowed by providing the reflecting sheet contact section on the front face of the case.

Further, a panel light source device according to the present invention is of a construction in which the reflecting sheet contact section is brought into contact with the reflecting sheet on the light guide plate and the reflecting sheet is held by the reflecting sheet contact section and the light guide plate sandwiching therebetween. With the reflecting sheet contact section brought into contact with the reflecting sheet on the light guide plate, the reflecting sheet can be held by the reflecting sheet contact section and the light guide plate sandwiching therebetween. Therefore, a movement of the reflecting sheet in the case can be suppressed.

Further, a panel light source device according to the present invention is of a construction in which the other end of the reflecting sheet is provided oppositely to a face of the light guide plate opposite to an light incident face thereof. With the other end of the reflecting sheet, which is bent, opposite to a face of the light guide plate facing an light incident face thereof, relative locations of the reflecting sheet and the light guide plate can be defined. That is, by overlapping an end of the light emitter side of the reflecting sheet on the front face of the light guide plate in a state where the reflecting sheet is brought into contact with a face of the light guide plate facing an light incident face thereof, no chance arises that overlapping becomes extinct even with a change in relative locations of both. Hence, an overlapping amount can be reduced without generating a clearance between the reflecting sheet and the light guide plate.

Further, a panel light source device according to the present invention is of a construction in which the case is a metal case obtained by press working and the reflecting sheet contact section is formed by deep drawing. With such a construction adopted, the reflecting sheet contact section can be provided to the case without increasing a cost, and without making assembly complex.

Further, a panel light source device according to the present invention is of a construction in which the case is a metal case obtained by press working and the reflecting sheet contact section is formed by bending. With such a construction adopted, the reflecting sheet contact section can be provided to the case without increasing a cost, and without making assembly complex.

Further, a panel light source device according to the present invention is of a construction in which the case is a resin case and the reflecting sheet contact section is made on an inner surface of the case by integral molding. With such a construction adopted, the reflecting sheet contact section can be provided to the case without increasing a cost, and without making assembly complex.

Further, a panel light source device according to the present invention is of a construction in which the case is constituted of a front face case and rear face case and the front face case is engaged with the rear face case to thereby the reflecting sheet contact section provided on the case is brought into contact with the reflecting sheet. With such a construction adopted, no necessity arises for complex assembly.

Further, a panel light source device according to the present invention is of a construction in which the light emitter is a linear light source, and the reflecting sheet contact section extends in the same direction as that of the linear light source so as to be brought into contact with the reflecting sheet in a linear region. With such a construction adopted, emitting light from the linear light source can be prevented from leaking through a clearance between the reflecting sheet and the light guide plate.

A display device according to the present invention includes: a light guide plate on a front face of which an optical sheet is provided; a light emitter to cause light to strike a side face of the light guide plate; a reflecting sheet, provided facing a rear face of the light guide plate, and an end of which wraps the light emitter to reach the front face thereof; a case, not only housing the light guide, the light emitter and the reflecting sheet, but also providing an opening in the front face side thereof, and equipped with a reflecting sheet contact section causing part of a front face thereof in the light emitter side farther than the opening to retreat toward the rear face side thereof to bring the part of a front face thereof into contact with the reflecting sheet; and a display panel provided facing the opening of the case.

Further, a display device according to the present invention is of a construction in which the reflecting sheet contact section is provided to a light source device case in an outer side spaced apart from a mounting position of the display panel.

Further, a display device according to the present invention includes: a light guide plate on a front face of which an optical sheet is provided; a light emitter to cause light to strike a side face of the light guide plate; a reflecting sheet, provided facing a rear face of the light guide plate, and an end of which wraps the light emitter to reach the front face thereof; an light source device case, not only housing the light guide plate, the light emitter and the reflecting sheet, but also providing an opening in the front face side, and equipped with a reflecting sheet contact section causing part of a wall face thereof in the rear face side to advance toward the front face side to bring the part of a wall face thereof into contact with the reflecting sheet; and a display panel provided facing the opening of the light source device case.

Further, a display device according to the present invention is of a construction in which the light emitter is a linear light source, and the reflecting sheet contact section extends along an end portion of the opening along which the light emitter is provided so as to be brought into contact with the reflecting sheet in a linear region.

The above and further objects and novel features of the invention will more fully appear from the following detailed description when the same is read in connection with the accompanying drawing. It is to be expressly understood, however, that the drawing is for purpose of illustration only and is not intended as a definition of the limit of the invention.

BRIEF DESCRIPTION OF THE DRAWINGS

FIG. 18 is a perspective view showing constituents of a reflecting sheet of FIG. 17.

DESCRIPTION OF PREFERRED EMBODIMENTS

First Embodiment

Figure 1:
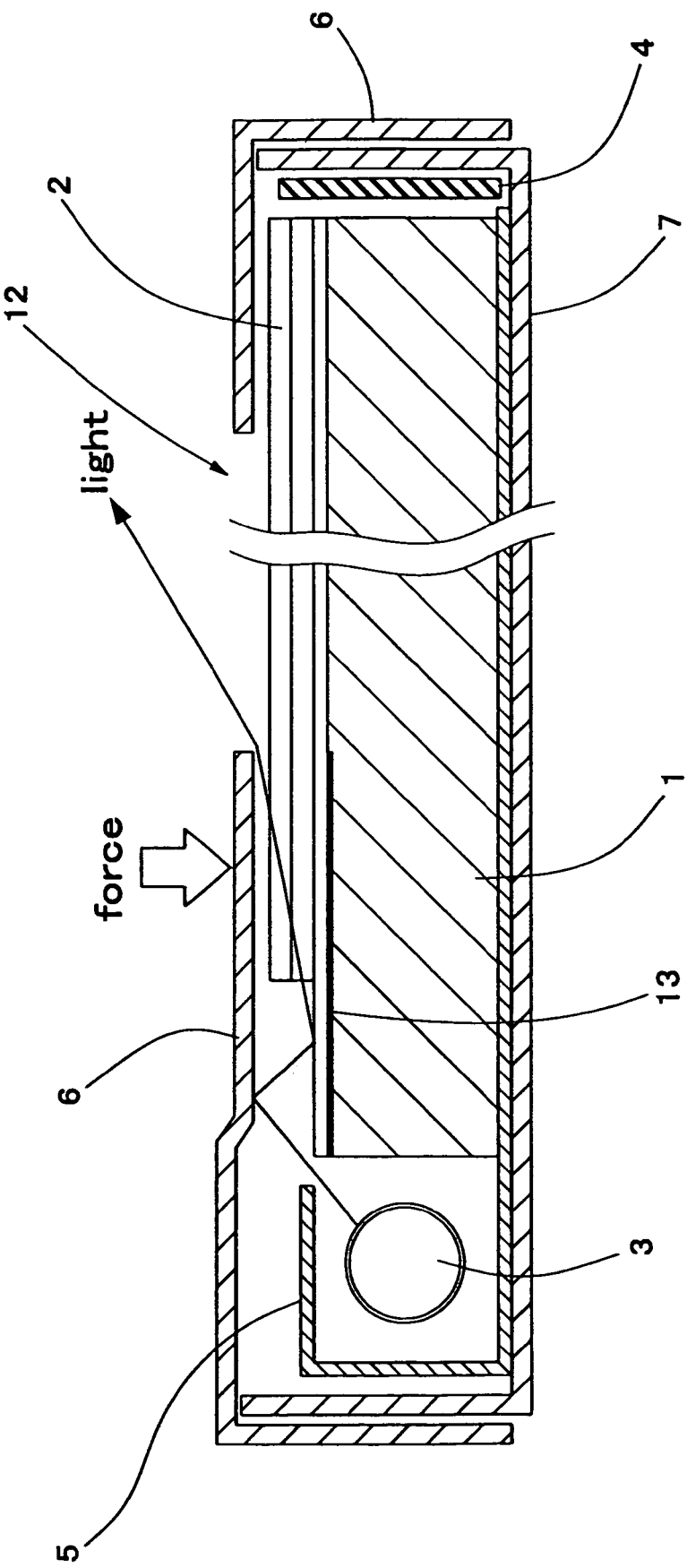
FIG. 1 is a sectional view showing an example construction of a conventional panel light source device, showing a back light device for a liquid crystal display device adopting a side light type.
Figure 2:
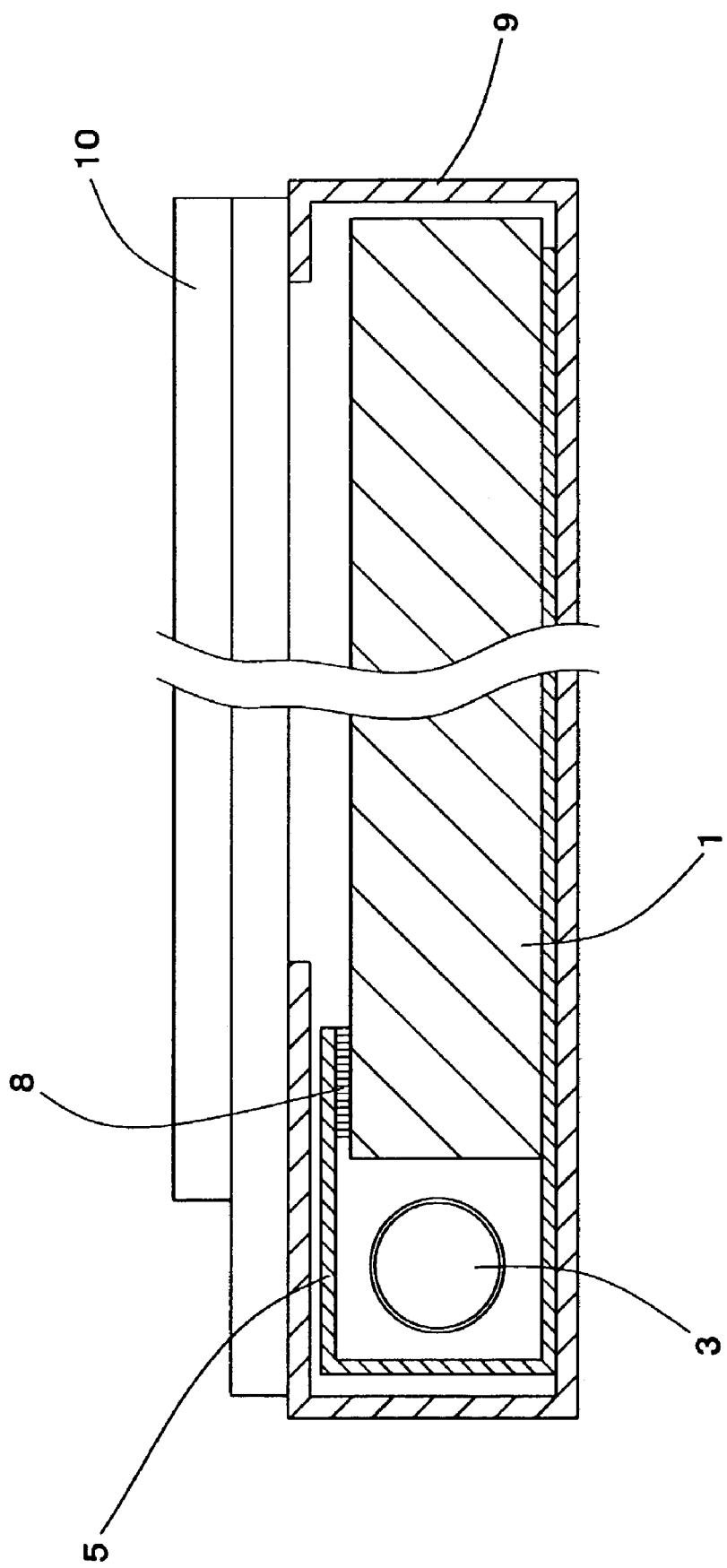
FIG. 2 is a sectional view showing an example construction of another conventional panel light source device, showing a device disclosed in Japanese Unexamined Patent Publication No. 2000-315414.
Figure 3:
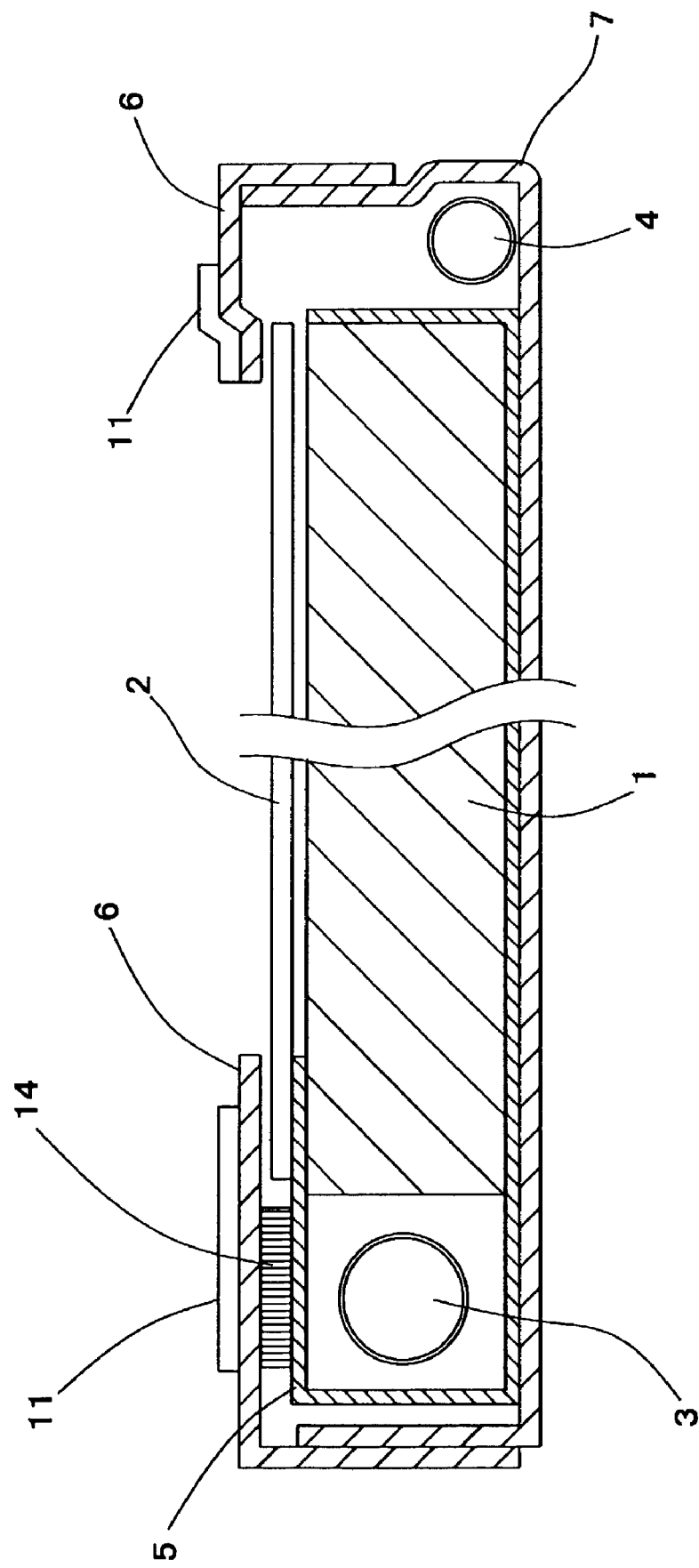
FIG. 3 is a sectional view showing an example construction of another conventional panel light source device, showing a device disclosed in Japanese Unexamined Patent Publication No. 2001-250416.
Figure 4:
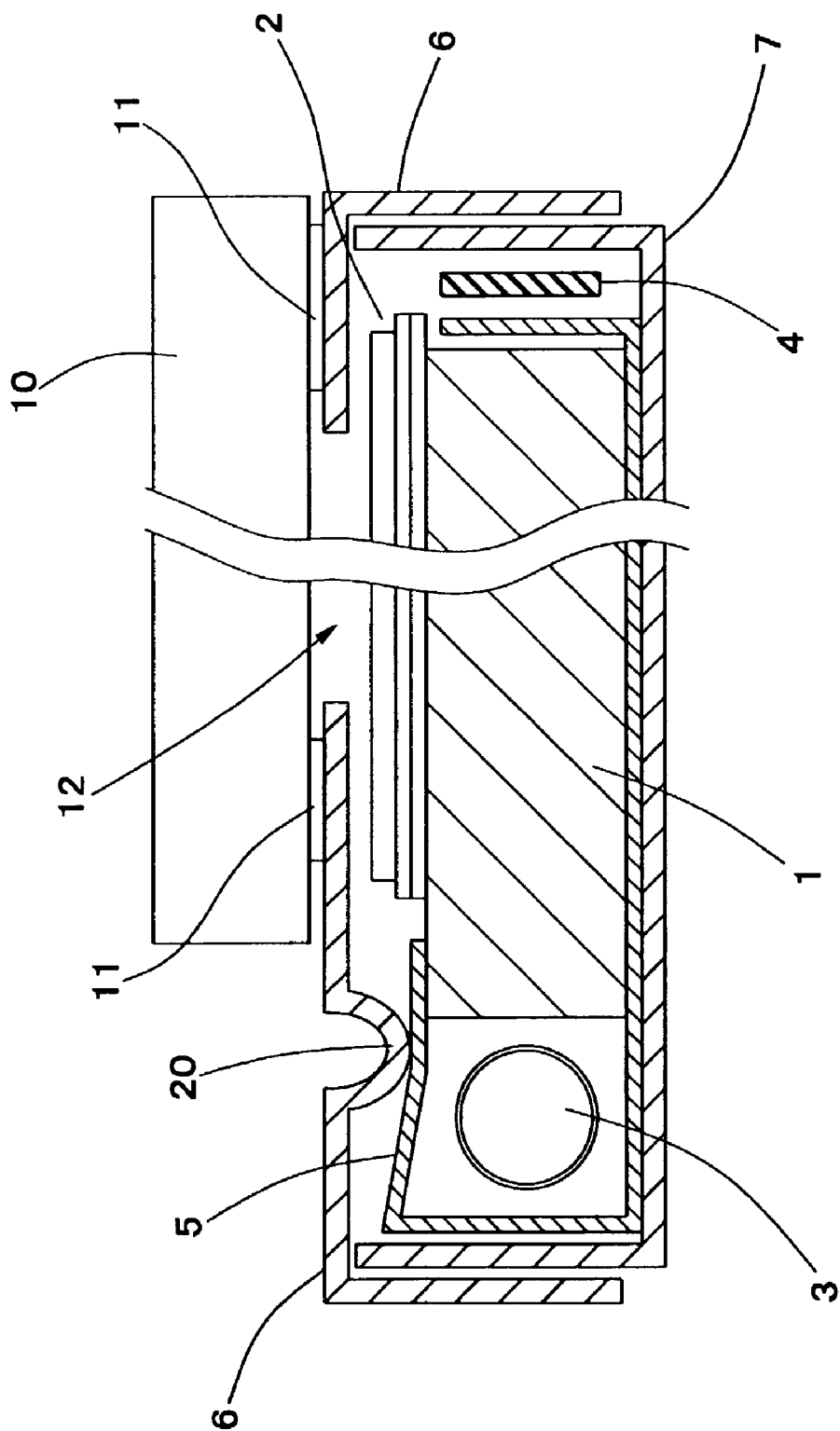
FIG. 4 is a sectional view showing an example construction of a display device according to a first embodiment of the present invention.

FIG. 4 is a sectional view showing an example construction of a display device according to a first embodiment of the present invention. In the figure, a numerical reference 1 indicate a light guide plate, 2 an optical sheet, 3 an light emitter, 4 a wire, 5 a reflecting sheet, 6 a front face case, 7 a rear face case, 10 a liquid crystal panel, 11 a double-sided tape, 12 an opening section and 20 a reflecting sheet contact section. The light guide plate 1, the optical sheet 2, the light emitter 3, the wire 4 and the reflecting sheet 5 are housed in a composite case obtained by engaging the front face case 6 and the rear face case 7 with each other to construct a panel light source device, and the panel light source device is mounted to the liquid crystal panel 10 with the double-sided tape 11 to construct a liquid crystal display device.

The light guide plate 1 is a transparent light guide made of an acrylic resin or the like having a prescribed refractive index and formed as an approximately rectangular plate-like object. In the light guide plate 1, a construction is such that one or more side faces serving as an light incident face, a front face (on the opening section 12 side) thereof serves as a light emitting face and incident light striking the light incident face is almost uniformly emitted from the light emitting face.

The optical sheet 2 is placed on the light emitting face of the light guide plate 1 and works as an optical correction sheet to make emitting light from the light guide plate 1 uniform or highly luminous. The optical sheet 2 is composed of: a diffusing sheet to diffuse the emitting light to make a luminance on the light emitting face uniform; a prism sheet for imparting a directivity to the emitting light to increase a luminance; a polarization separation sheet for reflecting a polarized light component to be absorbed by a polarization plate (not shown) of the liquid crystal display device panel for reuse to thereby increase a luminance; and others. Actually used as the optical sheet 2 is one or a combination of two or more selected from the group consisting of the above sheets when required.

The light emitter 3 is a linear light source such as a fluorescence discharge tube arranged along a side face of the light guide plate 1 at the side face side thereof and supplies incident light on the light incident face of the light guide plate 1. The wire 4 is a power supply line for supplying a power source to the fluorescence discharge tube. The light emitter 3 and the wire 4 are incorporated in a light emitter unit.

Figure 5:
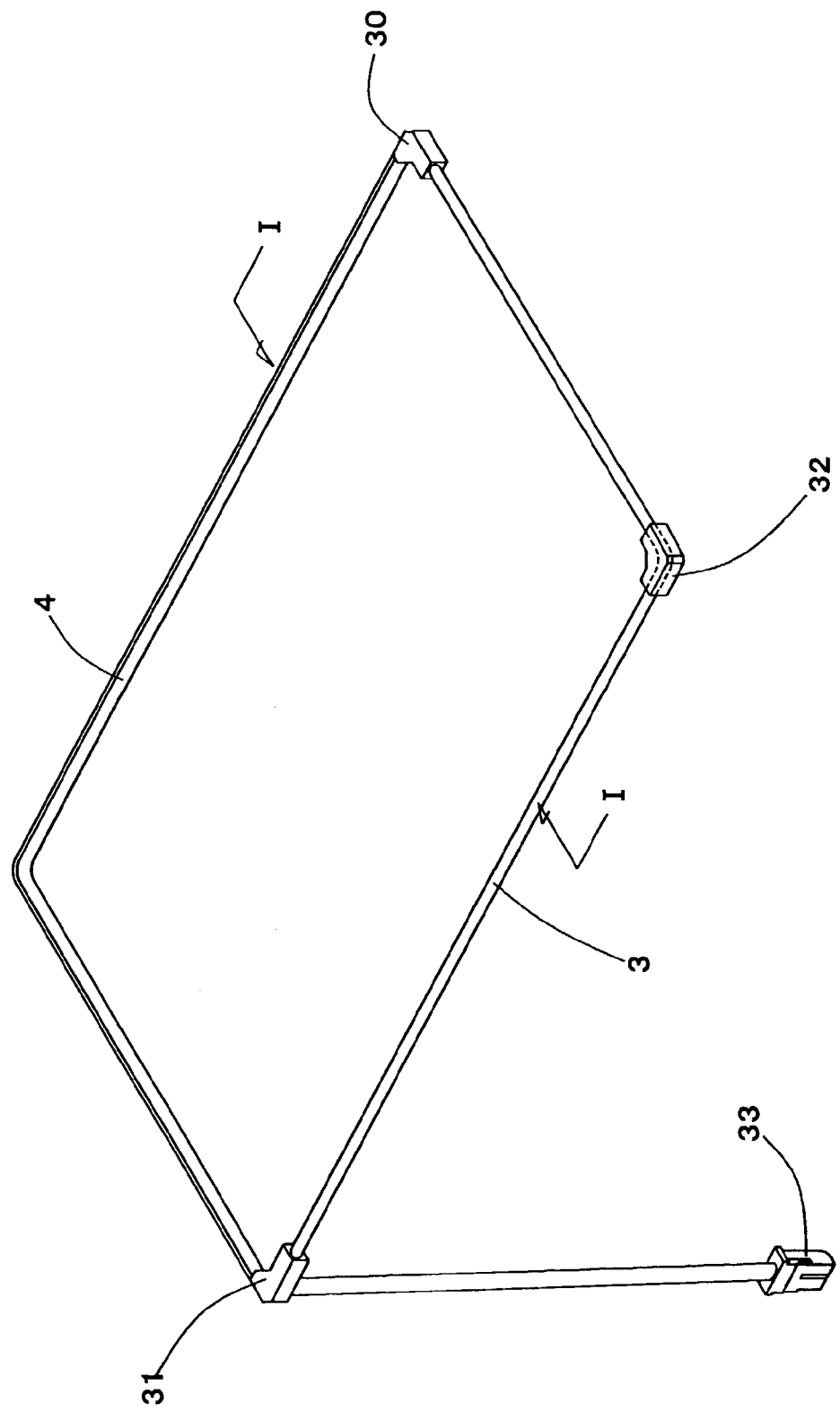
FIG. 5 is a perspective view showing an example of a light emitter unit and a light emitter 3 and a wire 4 shown in FIG. 4 corresponds to a section taken along line I—I of FIG. 5.

FIG. 5 is a perspective view showing an example of a light emitter unit and a light emitter 3 and a wire 4 shown in FIG. 4 corresponds to a section taken along line I—I of FIG. 5 The light emitter 3 is a light emitter of a L letter type at both ends of which discharging electrode sections 30 and 31 are provided, the wire 4 is a flat cable of an L letter type and a power source is supplied to the discharging electrode sections 30 and 31 through the wire 4 from a power source connector 33. That is, the light emitter unit is in the shape of an approximate rectangle, the discharging electrodes 30 and 31 are disposed at diagonally opposed vertices thereof, one of the other vertices corresponds to a bend section of the light emitter 3 and a corner holder 32 made of an elastic material (for example of rubber) is provided at the bend section.

The reflecting sheet 5 reflects light deviated from a light guide path (a normal path along which light is transmitted through the light guide plate 1 and the optical sheet 2, and emitted from the opening section 12) of light emanating from the light emitter 3 back to the light guide path not only to ameliorate a luminance of the panel light source device, but also to prevent stray light from occurring so as to make the luminance on the light emitting surface uniform. The reflecting sheet 5 is made of a member high in surface reflectance and formed in a thin sheet using aluminum, a resin or the like and disposed abutting on the rear face of the light guide plate 1 on the rear side thereof, covering all over the surface of the rear face thereof. That is, the reflecting sheet 5 is provided facing a face opposite to the light emitting face of the light guide plate 1.

The end portion at the light emitter 3 side of the reflecting sheet 5 is bent in the shape of a Greek letter Π open sideways and the end thereof travels externally around and spaced apart from the side of the light emitter 3 arranged close to the light guide plate 1 to reach the front face of the light guide plate 1. That is, the reflecting sheet 5 is bent so as to wrap the light emitter 3 and a part of the reflecting sheet 5 functions as a lamp reflector.

Furthermore, the end portion is overlapped on the front face of the light guiding plate 1 to prevent emitting light from the light emitter 3 from escaping through a clearance between the light guide plate 1 and the reflecting sheet 5. Note that the end portion is placed so as not to overlap the optical sheet 2.

The end portion in the wire 4 side of the reflecting sheet 5 is bent in the shape of an erected letter L and placed abutting on a side face of the light guide plate 1 on the wire 4 side thereof. That is, the reflecting sheet 5 is placed facing a face opposite to the light incident face of the light guide plate 1.

Figure 6:
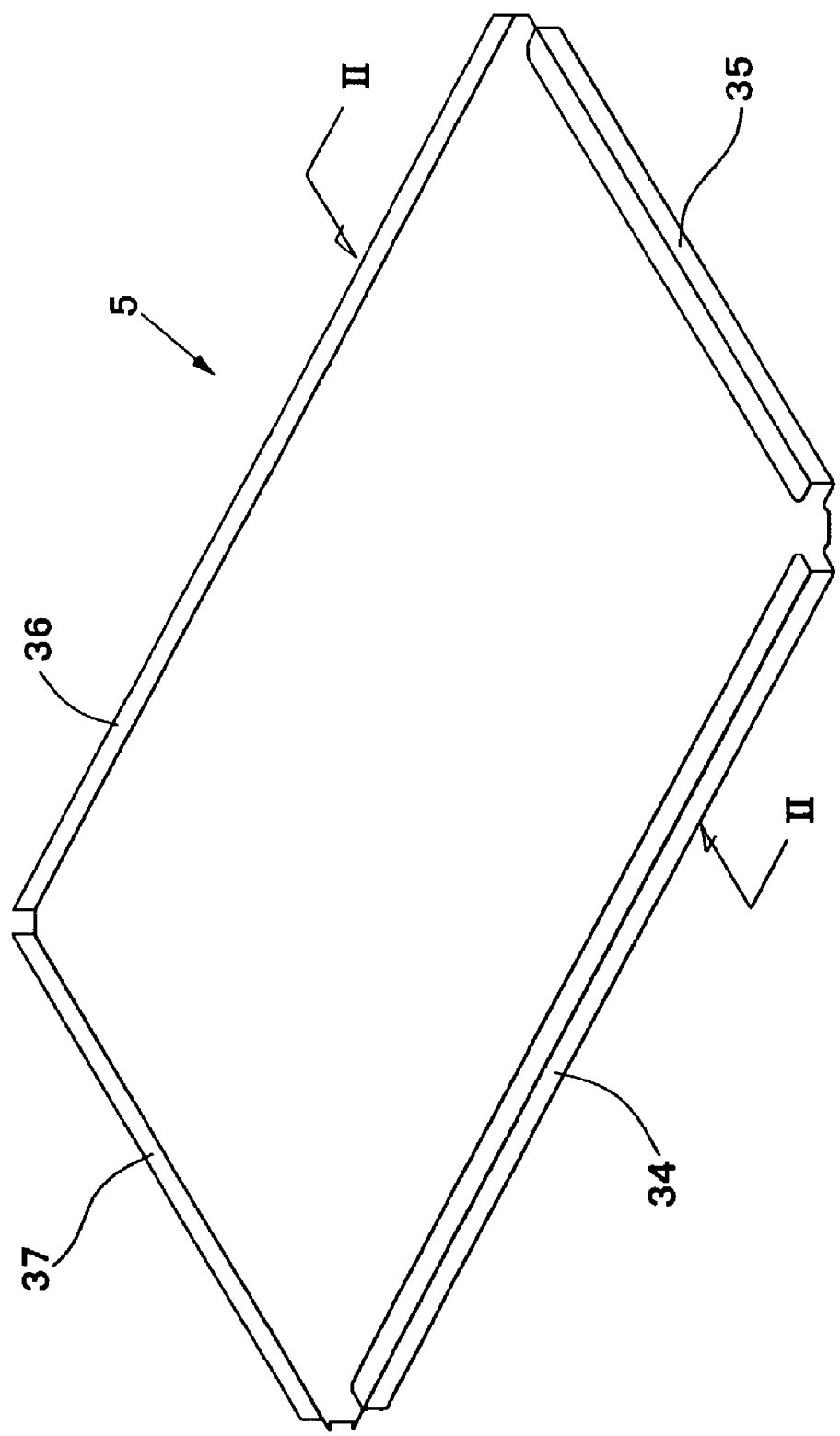
FIG. 6 is a perspective view showing an example of a reflecting sheet 5 of FIG. 4 and the reflecting sheet 5 shown in FIG. 4 corresponds to a section taken along line II—II of FIG. 6.

FIG. 6 is a perspective view showing an example of a reflecting sheet 5 of FIG. 4 and the reflecting sheet 5 shown in FIG. 4 corresponds to a section taken along line II—II of FIG. 6. The end portions 34 and 35 of two sides adjacent to each other close to the light emitter 3 of the light emitter unit are bent in the shape of a Greek letter Π open sideways; and the end portions 36 and 37 of two sides corresponding to the wire 4 are bent in the shape of an erected letter L.

The front face case 6 and rear face case 7 are both constituents of a composite case of a panel light source device obtained by press working on a metal plate such as those of aluminum, iron or the like and engaged with each other to thereby, form a slim case of the shape of an approximate box. The opening section 12 for emitting light from a panel light source device through the optical sheet 2 is formed in the front face case 6 and the opening section 12 works as a light emitting surface of the panel light source device. The double-sided tape 11 for mounting the liquid crystal panel 10 is adhered to the outer surface of the inner periphery of the opening section 12 and the liquid crystal panel 10 is mounted so that a display region of the liquid crystal panel 10 aligns with the light emitting surface.

The reflecting sheet contact section 20 is a contact section formed on the front face of the front face case 6 so that the front face of the front face case 6 is brought into contact with the reflecting sheet 5 housed in the composite case. The reflecting sheet contact section 20 is obtained by deep drawing of part of the front face of the front face case 6 so as to retreat toward the rear face direction during press working of the front face case 6. In this case, the inner surface side becomes convex and the outer surface side becomes concave and when the light guide plate 1, the reflecting sheet 5 and others are housed in the rear face case 7 and the front face case 6 is engaged with the rear face case 7, the fore end of the convex portion is brought into contact with the reflecting sheet 5.

Figure 7:
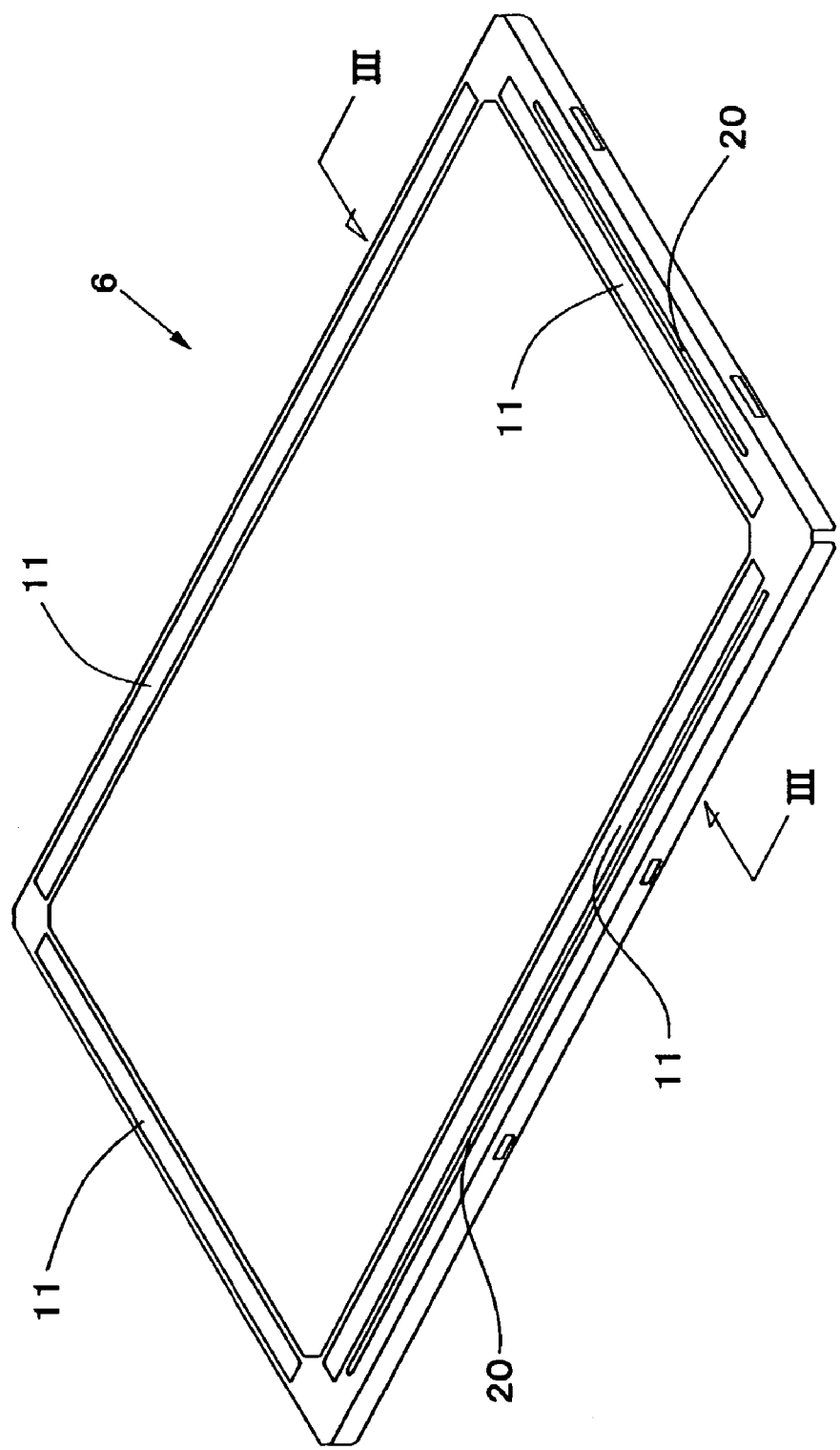
FIG. 7 is a perspective view showing an example of a front face case 6 of FIG. 4 and the front face case 6 shown in FIG. 4 corresponds to a section taken along line III—III of FIG. 7.

FIG. 7 is a perspective view showing an example of a front face case 6 of FIG. 4 and the front face case 6 shown in FIG. 4 corresponds to a section taken along line III—III of FIG. 7. The opening section 12 is formed so as to occupy the greater part of the front face of the front face case 6 and therefore, the front face case 6 assumes the shape of a picture frame. Pieces of the double-sided tape 11 are adhered along and adjacent to 4 inner peripheral sides of the opening section 12 in the shape of an approximate rectangle and the reflecting sheet contact sections 20 are provided outside the pieces of the double-sided tape 11 on two sides close to the light emitter 3. Each reflecting sheet contact section 20 is formed extending along the same direction as a corresponding one arm of the light emitter 3, which is a linear light source, so the contact region is a linear region extending in the same direction as the light emitter 3. That is, a reflecting sheet contact section 20 is formed in the shape extending in the same direction as and along a corresponding side (edge portion) of the opening section 12. In such a way, the reflecting sheet contact sections 20 are provided over almost all the regions of the light emitter 3.

Figure 8:
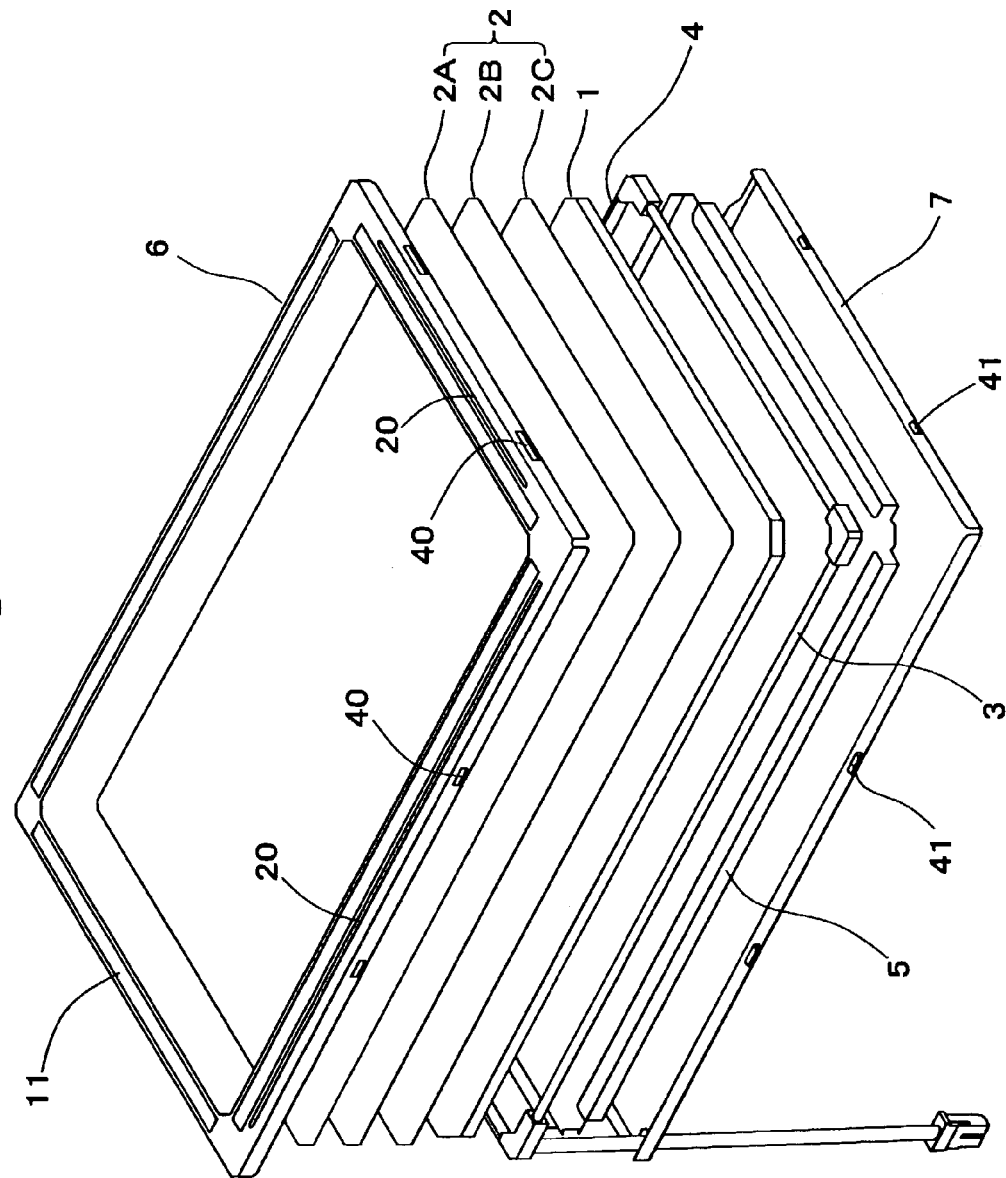
FIG. 8 is a perspective view showing constituents of a panel light source device of FIG. 4 and a way of assembly thereof.

FIG. 8 is a perspective view showing constituents of a panel light source device of FIG. 4 and a way of assembly thereof. The reflecting sheet 5 is placed in the rear face case 7 and thereafter, the light emitter unit is housed therein. On this occasion, the light emitter 3 is housed inside an end of the reflecting sheet 5 in the shape of a Greek letter Π open sideways and a wire 4 is housed outside of an end of the reflecting sheet in the shape of an erected letter L. Thereafter, the other constituents are sequentially housed: the light guide plate 1 and the optical sheet 2 (the diffusing sheet 2C, the prism sheet 2B and the polarization separation sheet 2A) in the order, and finally, an engaging section (engaging hole) 40 of the front face case 6 is caught by an engaging section (engaging nail) 41 of the rear face case to thereby obtain the assembled whole.

In such a way, the reflecting sheet contact sections 20 formed on the inner surface by causing parts of the front face case 6 to retreat toward the rear face side are brought into contact with the reflecting sheet 5 housed in the composite case to thereby enable the reflecting sheet 5 to be pressed onto the light guide plate 1. Hence it is prevented to cause a clearance to be generated between the light guide plate 1 and the reflecting sheet 5 to thereby leak emitting light of the light emitter 3 and therefore, reduction in luminance on the light emitting surface can be prevented from occurring. Moreover, it can be prevented that light escaped from the clearance becomes stray light to appear on the light emitting surface and to cause luminance irregularity, resulting in display irregularity of the liquid crystal display device.

Furthermore, with the reflecting sheet contact sections 20 formed as parts of the front face case 6, it is prevented to produce a clearance between the light guide plate 1 and the reflecting sheet 5 without increasing the number of constituents and making assembly complicated. Especially, in a case where the front face case 6 is a metal case obtained by press working, the front face case 6 can be realized without increasing a cost by deep drawing of the reflecting sheet contact sections 20 simultaneously performed during the press working.

Since the reflecting sheet 5 is held by the reflecting sheet contact sections 20 and the light guide plate 1 sandwiching therebetween, it can be suppressed for the reflecting sheet 5 to move and cause a positional shift in the composite case. Consequently, since an overlapping amount between the reflecting sheet 5 and the light guide plate 1 can be reduced to cause the light emitting surface to be broader as compared with an area of the light guide plate 1, reduction can be achieved in a distance from an edge of the light emitting surface to the outer periphery of the composite case, that is a width of the outer peripheral portion of the opening section 12, with the result of a smaller size light source device.

Especially, this is effective in a case where the reflecting sheet 5 is not fixed in the composite case. In addition thereto, with the bend in the shape of an erected letter L of an end portion of the reflecting sheet 5 in the side opposite to the light incident face of the light guide plate 1, a relative positional shift between the reflecting sheet 5 and the light guide plate 1 can be suppressed in a direction of decreased overlapping therebetween. Therefore, with a further decreased overlapping amount, a width of the outer peripheral portion of the opening section 12 can be reduced.

Note that it is general to use a resin sheet as the reflecting sheet 5 for reduction in weight and the resin sheet is a flexible material strong in restoring force against a bending pressure. Hence, even if the reflecting sheet contact sections 20 are brought into contact with the reflecting sheet at a point in the light emitter 3 side spaced apart from the light guide plate 1, the reflecting sheet 5 can be held by the reflecting sheet contact sections 20 and the light guide plate 1 sandwiching therebetween. In this case a width of the outer peripheral portion of the opening section 12 can be narrower.

Second Embodiment

While in the first embodiment, description is given of the case where deep drawing is applied to the front face case 6 to form the reflecting sheet contact sections 20, description in this embodiment will be given of a case where bending is applied to form a reflecting sheet contact section.

Figure 9:
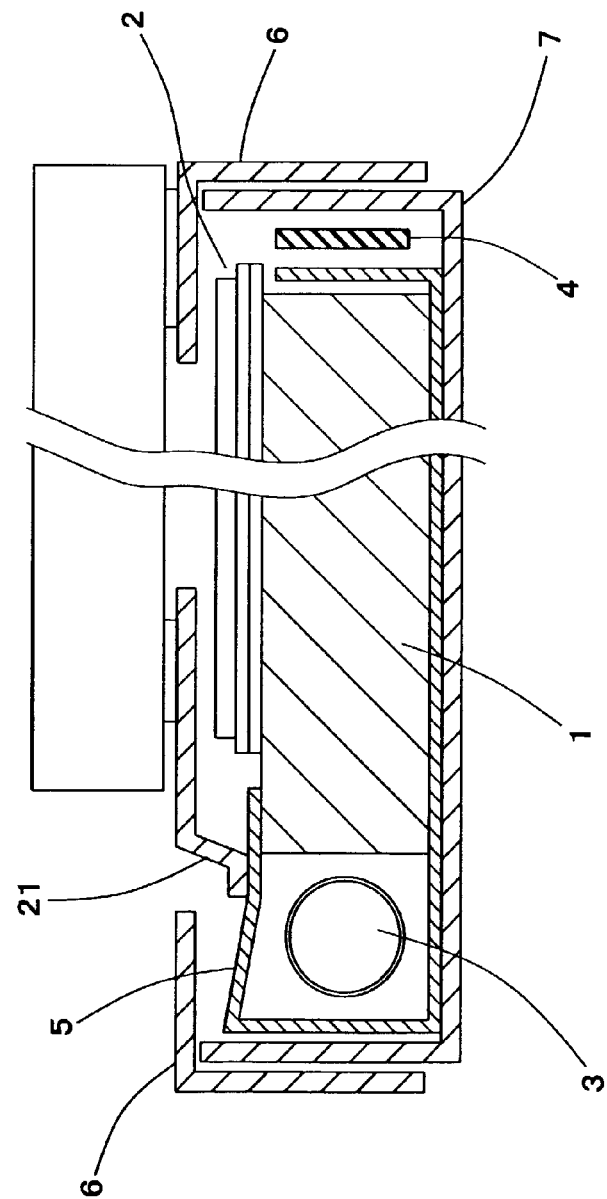
FIG. 9 is a sectional view showing an example construction of a panel light source device according to a second embodiment of the present invention.

FIG. 9 is a sectional view showing an example construction of a panel light source device according to a second embodiment of the present invention. In the figure, a numerical reference 1 indicates a light guide plate, 2 an optical sheet, 3 a light emitter, 4 a wire, 5 a reflecting sheet, 6 a front face case, 7 a rear face case and 21 a reflecting sheet contact section. The reflecting sheet contact section 21, similar to the reflecting sheet contact section 20 of FIG. 4, is a contact section formed on the front face of the front face case 6 so that the front face of the front face case is brought into contact with the reflecting sheet 5 housed in a composite case. The reflecting sheet contact section 21 is obtained by bending so that a part of the front face of the front face case 6 retreat in the rear face direction during press working of the front face case 6.

Thus, the reflecting sheet contact section 21 formed by bending a part of the front face case 6 is also brought into contact with the reflecting sheet 5 housed in the composite case to thereby enable the reflecting sheet 5 to be placed into a state of being pressed onto the light guide plate 1. Hence, there can be obtained an effect similar to the effect of the case of the first embodiment.

Third Embodiment

While in the first and second embodiments, descriptions are given of the example cases where the reflecting sheet contact sections 20 and 21 are brought into contact with the reflecting sheet 5 in the light emitter 3 side thereof, spaced apart from the light guide plate 1, description in this embodiment will be given of a case where a reflecting sheet contact section is brought into contact with the reflecting sheet 5 on the light guide plate 1.

Figure 10:
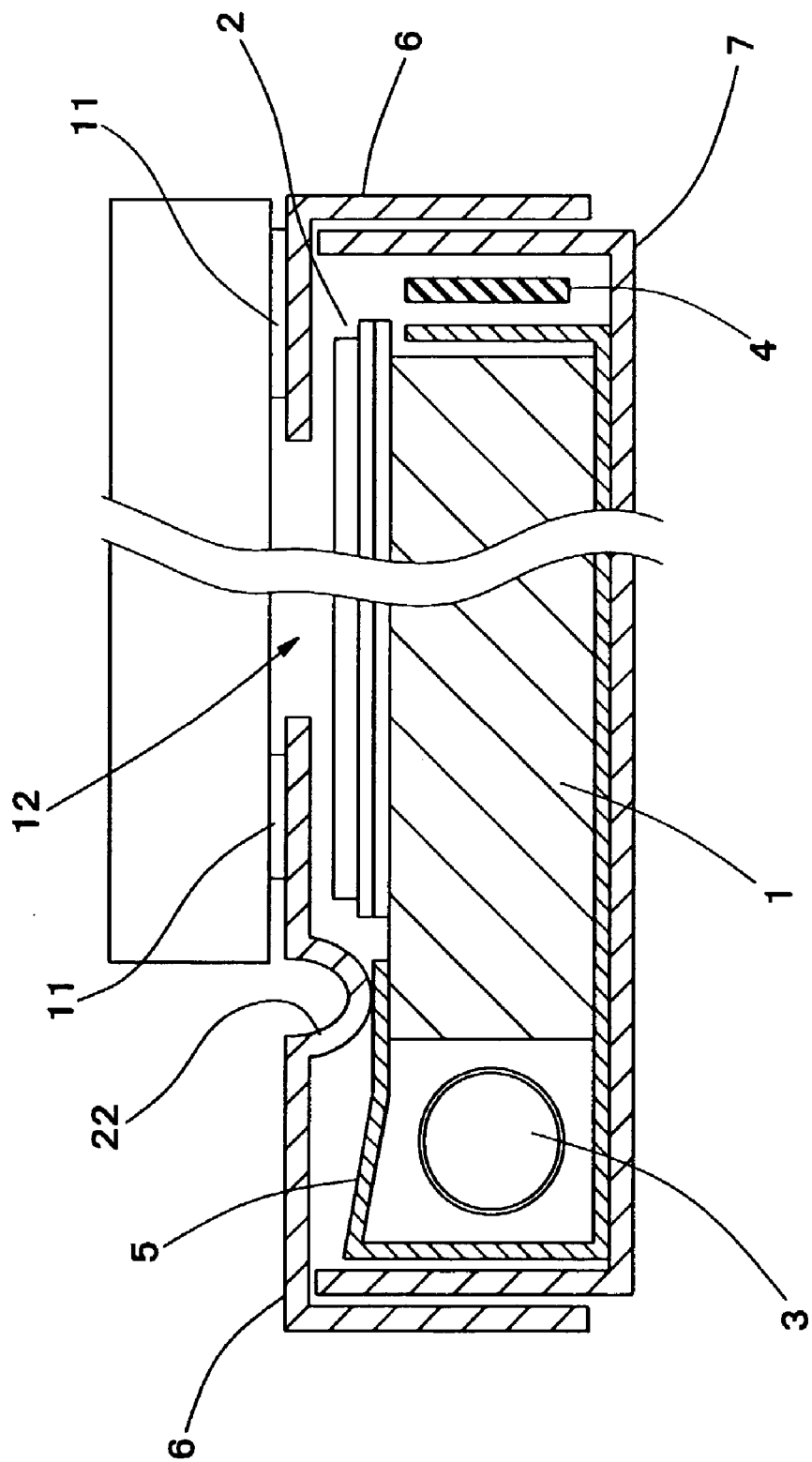
FIG. 10 is a sectional view showing an example construction of a panel light source device according to a third embodiment of the present invention.

FIG. 10 is a sectional view showing an example construction of a panel light source device according to a third embodiment of the present invention. In the figure, a numerical reference 1 indicates a light guide plate, 2 an optical sheet, 3 a light emitter, 4 a wire, 5 a reflecting sheet, 6 a front face case, 7 a rear face case and 22 a reflecting sheet contact section. The reflecting sheet contact section 22, similar to the case of the first embodiment (FIG. 4), is a contact section formed on the front face of the front face case 6 by deep drawing so that the front face of the front face case 6 is brought into contact with the reflecting sheet 5 housed in a composite case.

The reflecting sheet 5 overlaps the front face of the light guide plate 1 and the reflecting sheet contact section 22 is brought into contact with the overlapping portion of the reflecting sheet 5. That is, the reflecting sheet contact section 22 is provided at a position facing the light guide plate 1 and in this respect, different from the cases of the first and second embodiments. In such a way, with contact of the reflecting sheet contact section 22 with the reflecting sheet 5 on the light guide plate 1, the reflecting sheet 5 can be held in a sandwiching way with more of certainty as compared with the first and second embodiments.

Moreover, in a case where an external pressure is imposed on the front face case 6, for example in a case where the front face case 6 receives a pressure from a liquid crystal panel 10, the pressure is transmitted from the reflecting sheet contact section 22 to the light guide plate 1 through the reflecting sheet 5 without transmitting the pressure to the optical sheet 2. Hence, when an external pressure is imposed, suppression can be achieved of degradation of a display quality of the liquid crystal display device.

Note that it is desirable that the reflecting sheet 5 does not overlap the optical sheet 2 at least at a contact position with the reflecting sheet contact section 22 and to be concrete, does not overlap the optical sheet 2, as shown in FIG. 10. While in this embodiment, description, similar to the first embodiment, is given of the example case where the reflecting sheet contact section 22 is formed by deep drawing, the reflecting sheet contact section 22 may be formed by bending, similar to the second embodiment.

Fourth Embodiment

While in the first to third embodiments, descriptions are given of the cases where the reflecting sheet contact sections 20 to 22 are each provided to the front face case 6 without including an end of the front face, description in this embodiment will be given of a case where a reflecting sheet contact section reaches a front face end of the front face case.

Figure 11:
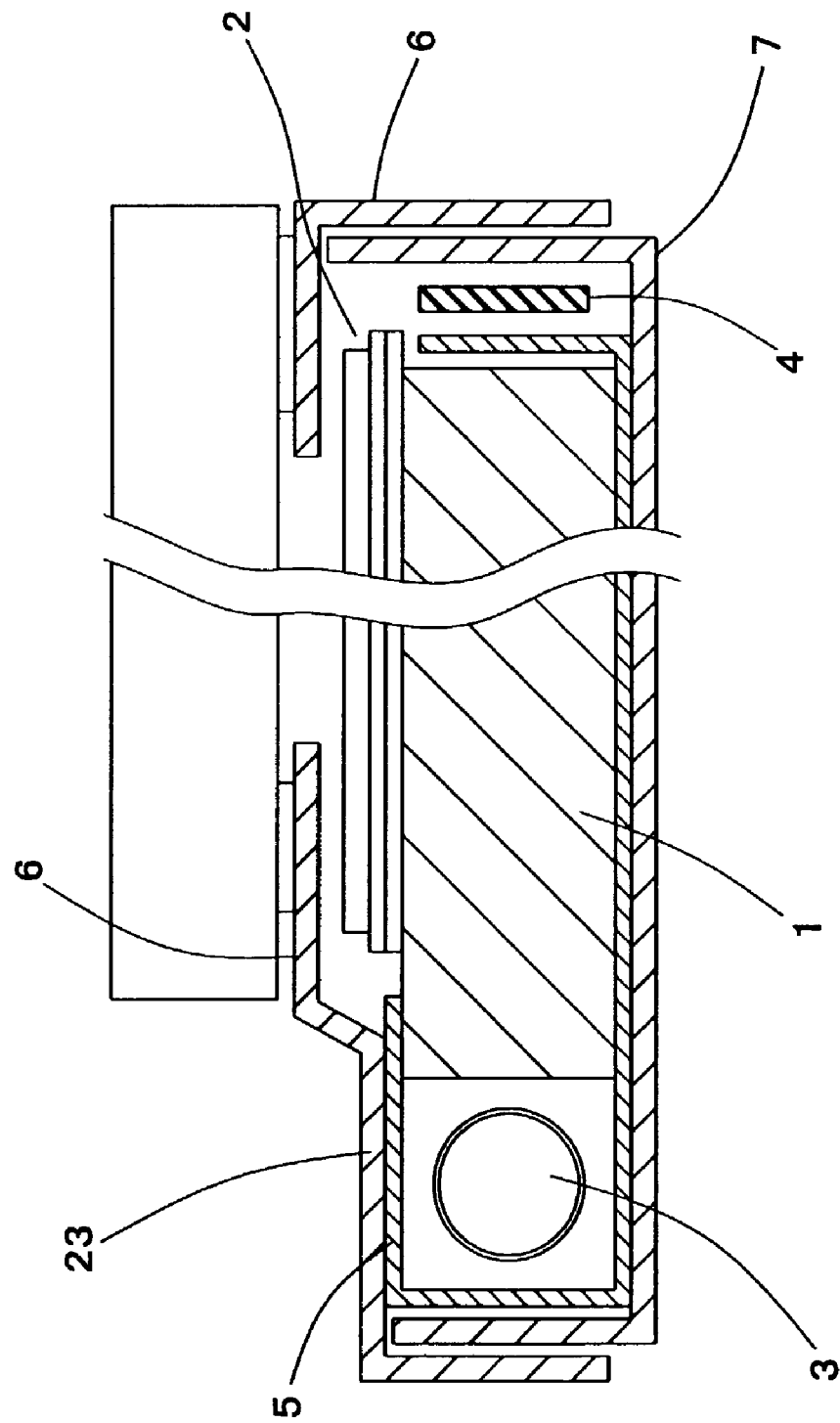
FIG. 11 is a sectional view showing an example construction of a panel light source device according to a fourth embodiment of the present invention.

FIG. 11 is a sectional view showing an example construction of a panel light source device according to a fourth embodiment of the present invention. In the figure, a numerical reference 1 indicates a light guide plate, 2 an optical sheet, 3 a light emitter, 4 a wire, 5 a reflecting sheet, 6 a front face case, 7 a rear face case and 23 a reflecting sheet contact section. The reflecting sheet contact section 23, similar to the cases of the first to third embodiments, is a contact section formed simultaneously with the front face case 6 by press working to cause the front face case 6 including an outer end thereof to retreat toward the rear face side. The reflecting sheet contact section 23 has only to at least press the reflecting sheet 5 to the light guide plate 1 and to thereby enable a clearance between the reflecting sheet 5 and the front face of the light guide plate 1 to be prevented from occurring, wherein the front face of the front face case 6 may be, as shown in FIG. 11, caused to retreat as far as an end thereof.

Fifth Embodiment

While in the first to fourth embodiments, descriptions are given of the example cases where the front face case 6 is a metal case obtained by press working and the reflecting sheet contact section 20 to 23 are formed by deep drawing, bending or the like, description in this embodiment will be given of a case where the front face case 6 is a resin case.

Figure 12:
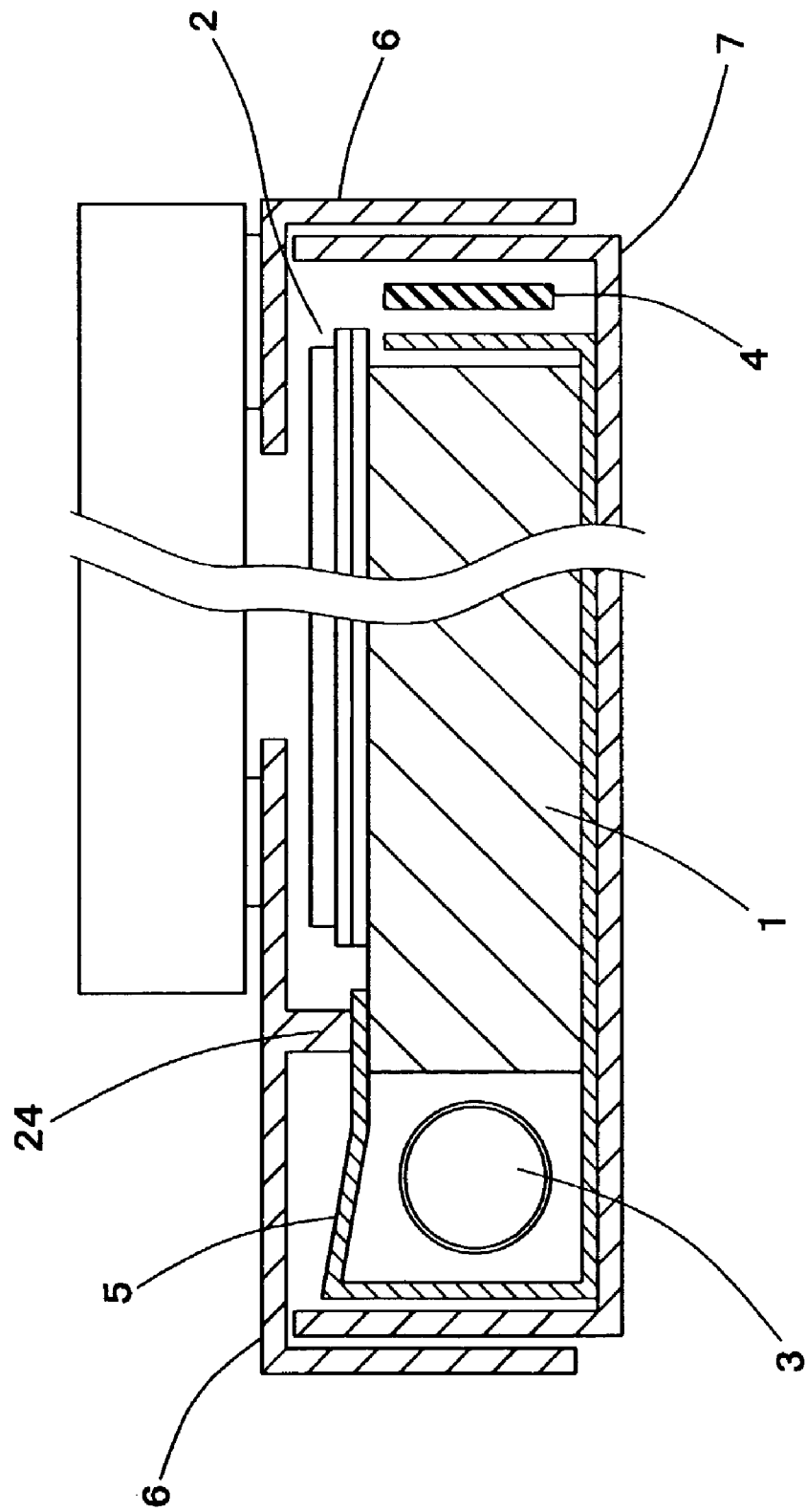
FIG. 12 is a sectional view showing an example construction of a panel light source device according to a fifth embodiment of the present invention.

FIG. 12 is a sectional view showing an example construction of a panel light source device according to a fifth embodiment of the present invention. In the figure, a numerical reference 1 indicates a light guide plate, 2 an optical sheet, 3 a light emitter, 4 a wire, 5 a reflecting sheet, 6 a front face case, 7 a rear face case and 24 a reflecting sheet contact section. The front face case 6 is a case obtained by resin molding and the reflecting sheet contact section 24 is formed on the inner surface of the front face. The reflecting sheet contact section 24 is integrally molded together with the front face case 6 in molding the front face case 6. Hence, similar to the case of a metal case, the reflecting sheet contact section 24 can be provided without increasing the number of constituents and enhancing a cost and an effect similar to the effects of the above embodiments is exerted.

Note that while in FIG. 12, there is shown the example case where the reflecting sheet contact section 24 is brought into contact with the reflecting sheet 5 on the light guide plate 1, the reflecting sheet contact section 24 may be brought into contact with the reflecting sheet 5 in the light emitter 3 side spaced apart from the light guide plate 1. Moreover, it is allowed that the reflecting sheet contact section 24 is made as a separate constituent to mount onto the front face case 6 or the reflecting sheet 5 and to thereby press the reflecting sheet 5 onto the light guide plate 1.

Sixth Embodiment

While in the first embodiment, description is given of the example case where the reflecting sheet contact section 20 is formed on the front face of the front face case 6, description in this embodiment will be given of another reflecting sheet contact section is also provided on the rear face of the rear face case 7.

Figure 13:
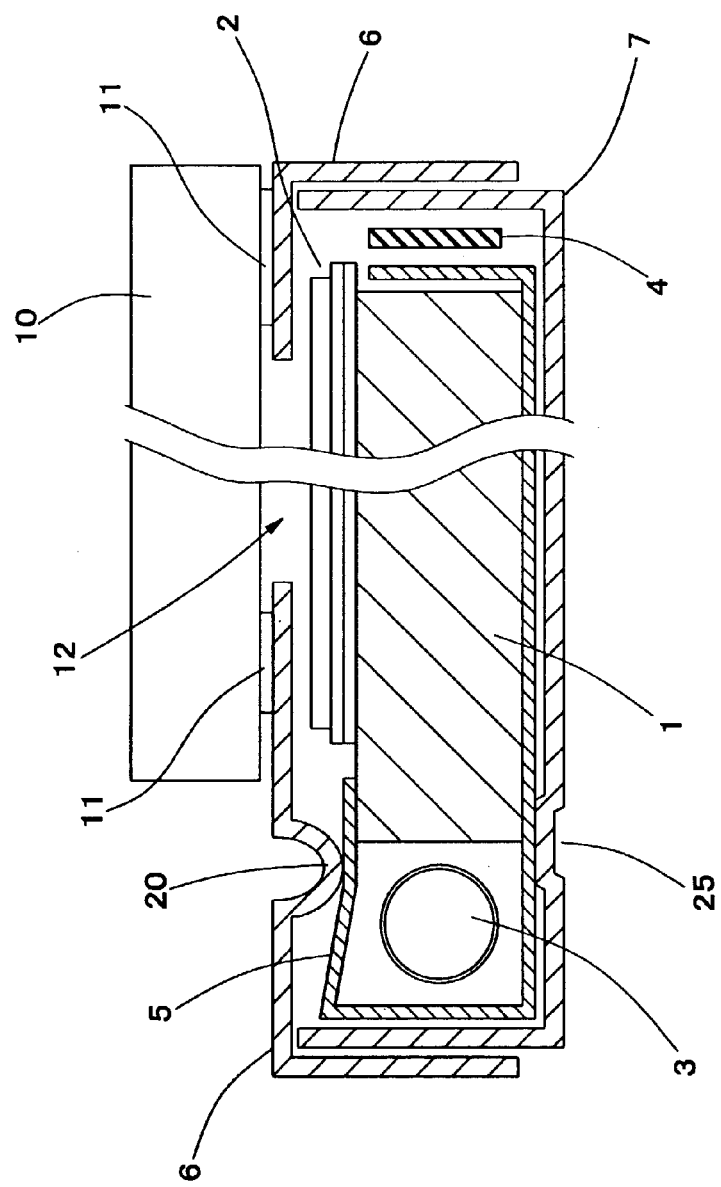
FIG. 13 is a sectional view showing an example construction of a panel light source device according to a sixth embodiment of the present invention.

FIG. 13 is a sectional view showing an example construction of a panel light source device according to a sixth embodiment of the present invention. In the figure, a numerical reference 1 indicates a light guide plate, 2 an optical sheet, 3 a light emitter, 4 a wire, 5 a reflecting sheet, 6 a front face case, 7 a rear face case and 20 and 25 reflecting sheet contact sections. The reflecting sheet contact section 25 is a contact section formed on the rear face of the rear face case 7 so that the rear face of the rear face case 7 is brought into contact the reflecting sheet 5 housed in the composite case.

The reflecting sheet contact section 25 is obtained by deep drawing so that part of the rear face of the rear face case 7 advances toward the front face side during press working of the rear face case 7. In this case, the inner surface side becomes convex and the outer surface side becomes concave and when the light guide plate 1, the reflecting sheet 5 and others are housed in the rear face case 7 and the front face case 6 is engaged with the rear face case 7, the fore end of the convex portion is brought into contact with the reflecting sheet 5 in the vicinity of an end face of the light guide plate 1.

Note that the reflecting sheet contact section 20 in contact with the reflecting sheet 5 similarly to the first embodiment shown in FIG. 4 is provided on the front face of the front face case 6. That is, in a state where the front face case 6 and the rear face case 7 are engaged with each other, the reflecting sheet contact section 20 presses the reflecting sheet 5 to the front face of the light guide plate 1 from the front side, while the reflecting sheet contact section 25 presses the reflecting sheet 5 to the rear face of the light guide plate 1 from the rear face side.

Figure 14:
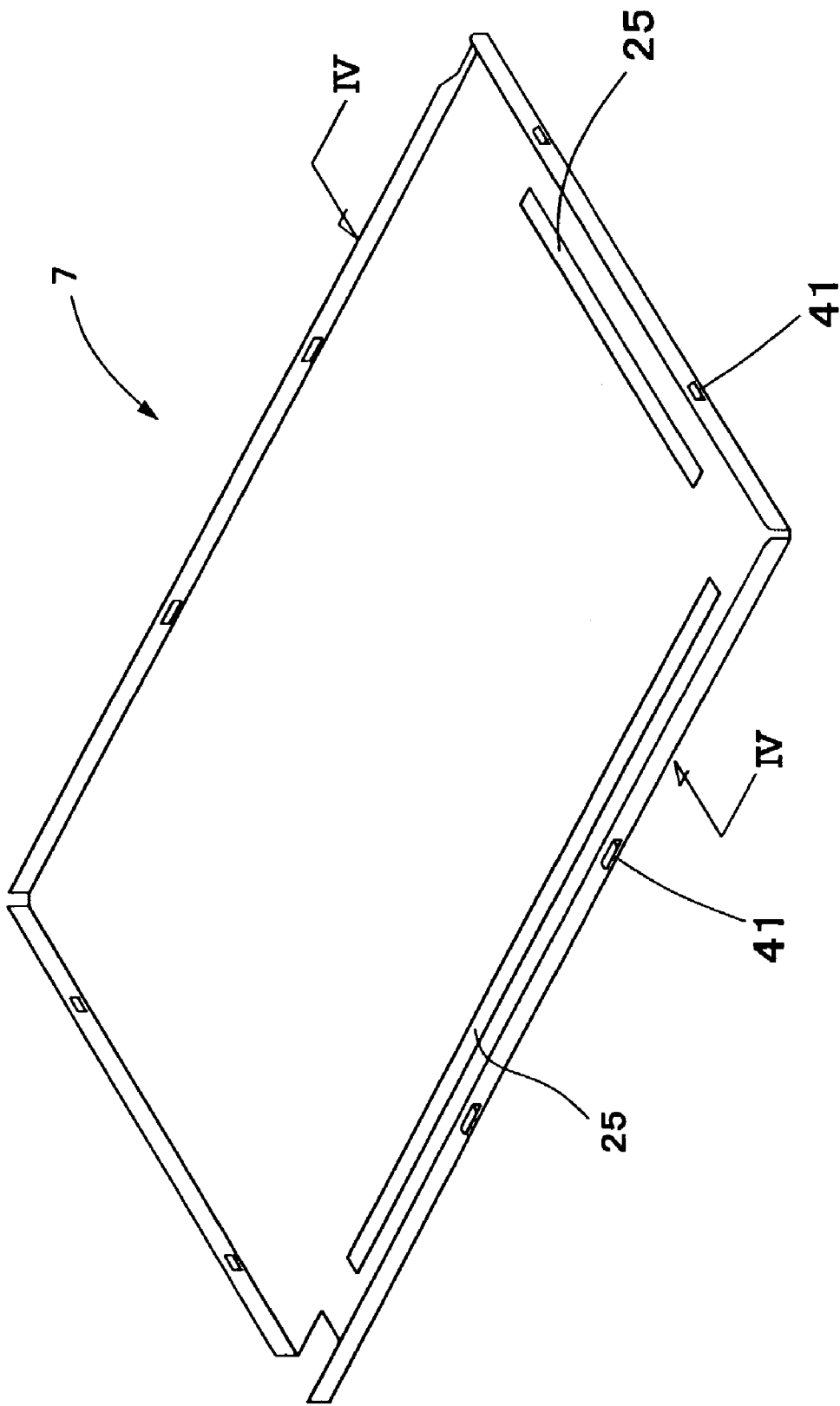
FIG. 14 is a perspective view showing an example of a rear face case 7 of FIG. 13 and the rear face case 7 shown in FIG. 13 corresponds to a section taken along line IV—IV of FIG. 14.

FIG. 14 is a perspective view showing an example of a rear face case 7 of FIG. 13 and the rear face case 7 shown in FIG. 13 corresponds to a section taken along line IV—IV of FIG. 14. The rear face case 7 is in the shape of an approximate rectangle and the front side is an opening. Reflecting sheet contact sections 25 are provided along two sides of the opening close to light emitters 3. The reflecting sheet contact sections 25 are formed extending in the same direction as the light emitter 3, which is a linear light source, and the contact regions thereof are linear regions extending in the same direction as the light emitter 3. In such way, the reflecting sheet contact sections 25 are provided over almost all the light emitter 3.

According to this embodiment, each reflecting sheet contact section 25 is formed on the inner surface of the rear face case 7 by advancing part of the rear face case 7 toward the front side and the reflection sheet contact sections 25 are brought into contact with the reflecting sheet 5 housed in the composite case to thereby, enable the reflecting sheet 5 to be pressed to the rear face of the light guide plate 1 from the rear face side. Hence, a clearance to be produced between the light guide plate 1 and the reflecting sheet 5 in the neighborhood of the light emitters 3 can be effectively prevented from occurring in cooperation with pressing the reflecting sheet 5 to the front face of the light guide plate 1 with the reflecting sheet contact section 20 provided on the front face case 6 from the front side. That is, clearlances can be prevented from occurring that are produced between the front face or rear face of the light guide plate 1 and the reflecting sheet 5.

Accordingly, it can be prevented that emitting light from the light emitters 3 are leaked through clearances to thereby reduce a luminance on the light emitting surface. Furthermore, It is also prevented that light evaded through the clearances become stray light and appear on the light emitting surface to cause luminance irregularity of a panel light source device, resulting in display irregularity of a liquid crystal display device.

Furthermore, with the reflecting sheet contact section 25 formed as part of the rear face case 7, it can be prevented from occurring that a clearance arises between the light guide plate 1 and the reflecting sheet 5 without increasing the number of constituents and without making assembly complicated. Especially, in a case where the rear face case 7 is a metal case, the reflecting sheet contact section 25 is formed by deep drawing simultaneously during press working to thereby realize a panel light source device without raising a cost.

Since not only is the wire 4 side end portion of the reflecting sheet 5 bent in the shape of an elected letter L to control a position of the reflecting sheet 5 relative to the light guide plate 1, but the reflecting sheet 5 is also held by the reflecting sheet contact section 25 and the light guide plate 1 sandwiching therebetween, it is effectively suppressed that the reflecting sheet 5 moves in the composite case and shifts in position. Especially, such a construction is effective in a case where the reflecting sheet 5 is not fixed in the composite case.

Note that while description is given of the case where the rear face case 7 is a metal case and the reflecting sheet contact section 25 is formed by deep drawing, the reflecting sheet contact section 25 may be formed by bending similarly to the case of the reflecting sheet contact section 21 in the second embodiment shown in FIG. 9. Furthermore, it is allowed that the rear face case 7 is a resin case instead of a metal case and the reflecting sheet contact section 25 is molded integrally therewith.

While description is given of the case where the reflecting sheet contact section 20 is provided on the front face of the front face case 6, no specific limitation is placed on additional provision of the reflecting sheet contact section 20, but only the reflecting sheet contact section 25 may also be sufficiently provided on the rear face of the rear face case 7.

Figure 15:
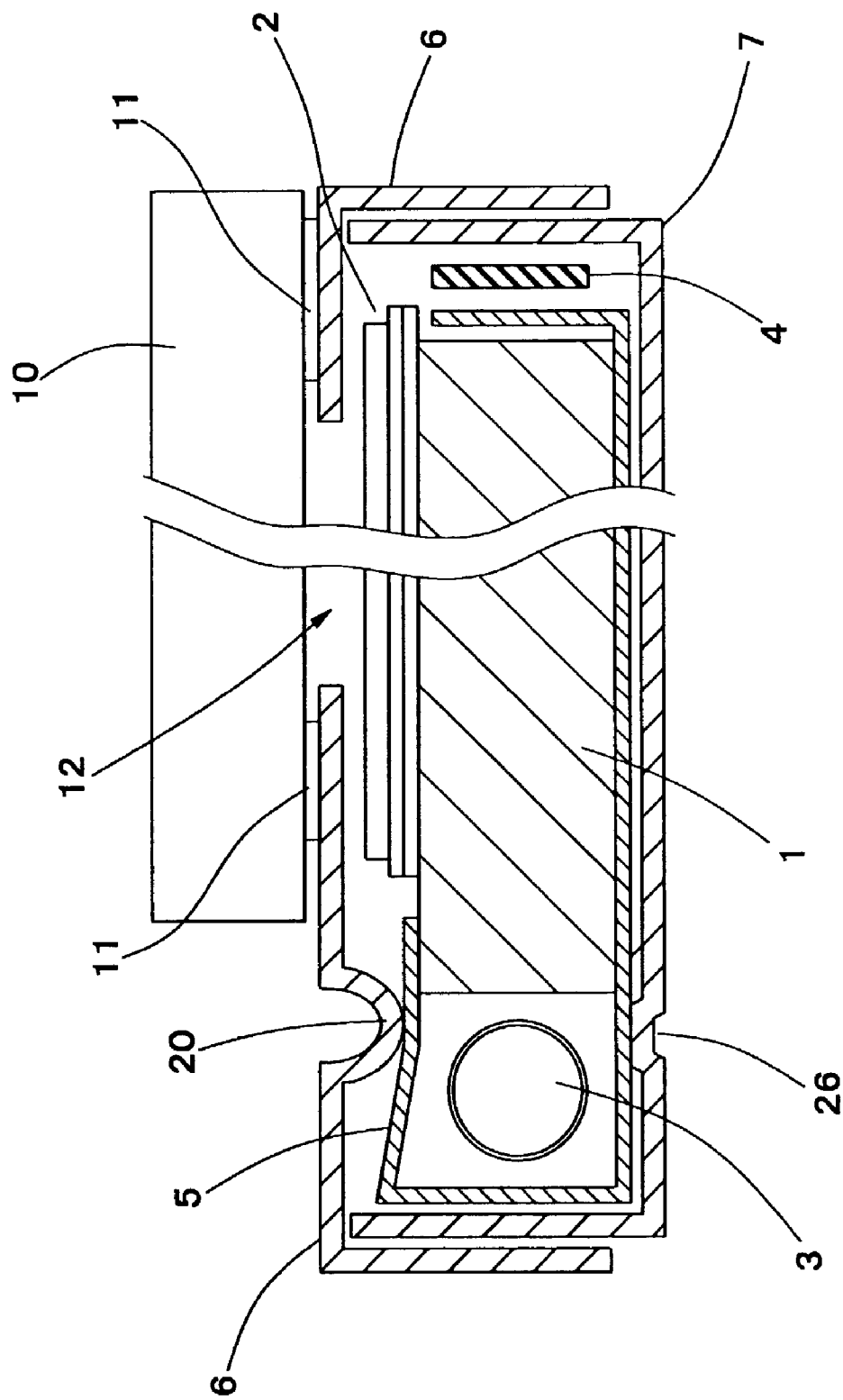
FIG. 15 is a sectional view showing another example of a reflecting sheet contact section provided to a rear face case 7.

FIG. 15 is a sectional view showing another example of a reflecting sheet contact section provided to a rear face case 7. While in FIG. 13, description is given of the case where the reflecting sheet contact section 25 is provided in the vicinity of an end face of the light guide plate 1, a reflecting sheet contact section 26 in FIG. 15 is provided so as to be brought into contact with the reflecting sheet 5 in the light emitter 3 side thereof spaced apart from the end face of the light guide 1. With such a construction adopted as well, the reflecting sheet 5 can be held by the light guide plate and the reflecting sheet contact section 26 sandwiching therebetween.

Figure 16:
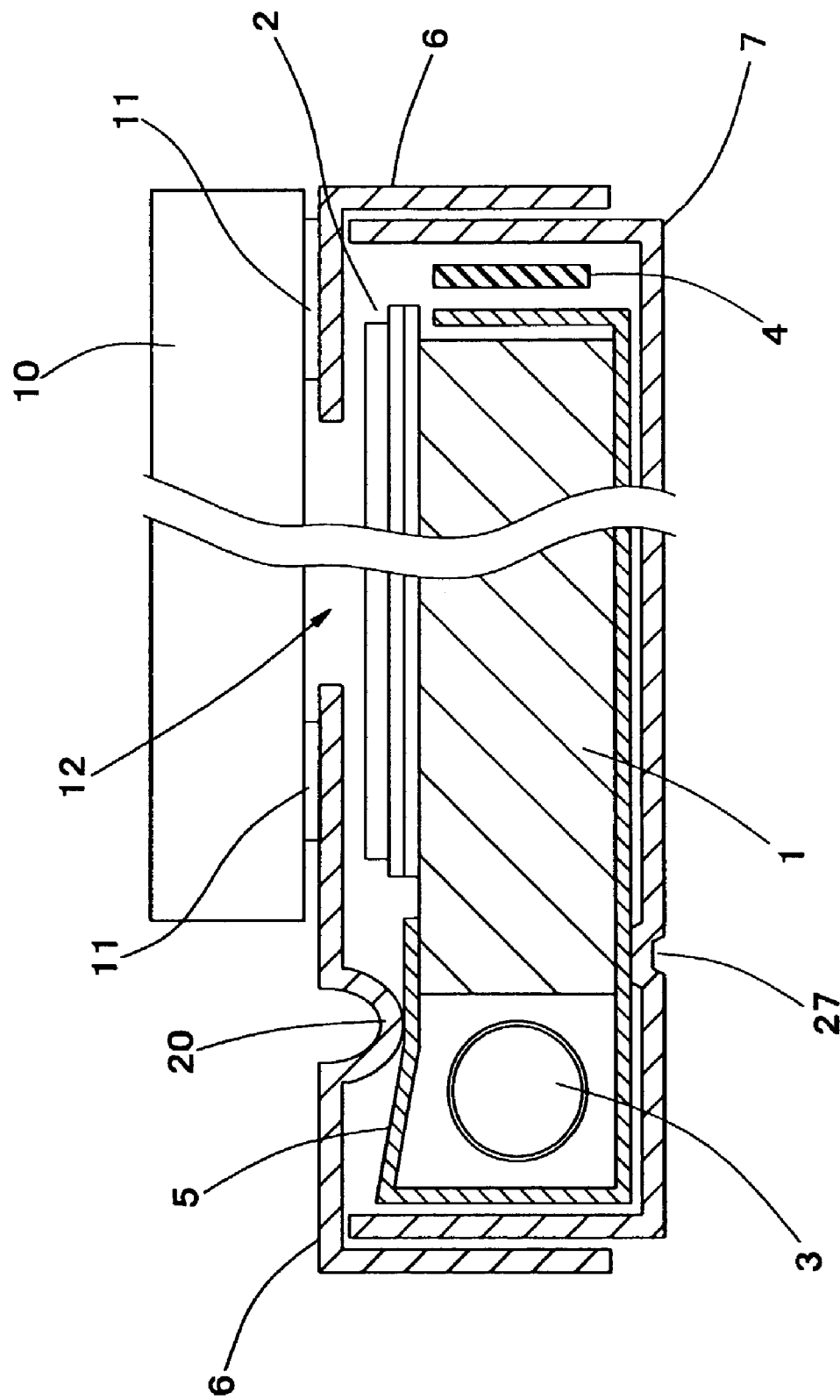
FIG. 16 is a sectional view showing another example of a reflecting sheet contact section provided to a rear face case 7.

FIG. 16 is a sectional view showing another example of a reflecting sheet contact section provided to a rear face case 7. In this figure, a reflecting sheet contact section 27 is provided so as to be brought into contact with the reflecting sheet 5 at a position on the light guide plate 1 some inward distance from the end face thereof. With such a construction adopted as well, the reflecting sheet 5 can be held by the light guide plate 1 and the reflecting sheet contact section 27 sandwiching therebetween.

Seventh Embodiment

In this embodiment, description will be given of a case where a reflecting sheet is composed of a first reflecting sheet facing the rear face of the light guide plate 1 and a second reflecting sheet wrapping the light emitter 3 in cooperation with an end of the first reflecting sheet. The other constituents of the construction are similar to corresponding constituents of the construction of the sixth embodiment.

Figure 17:
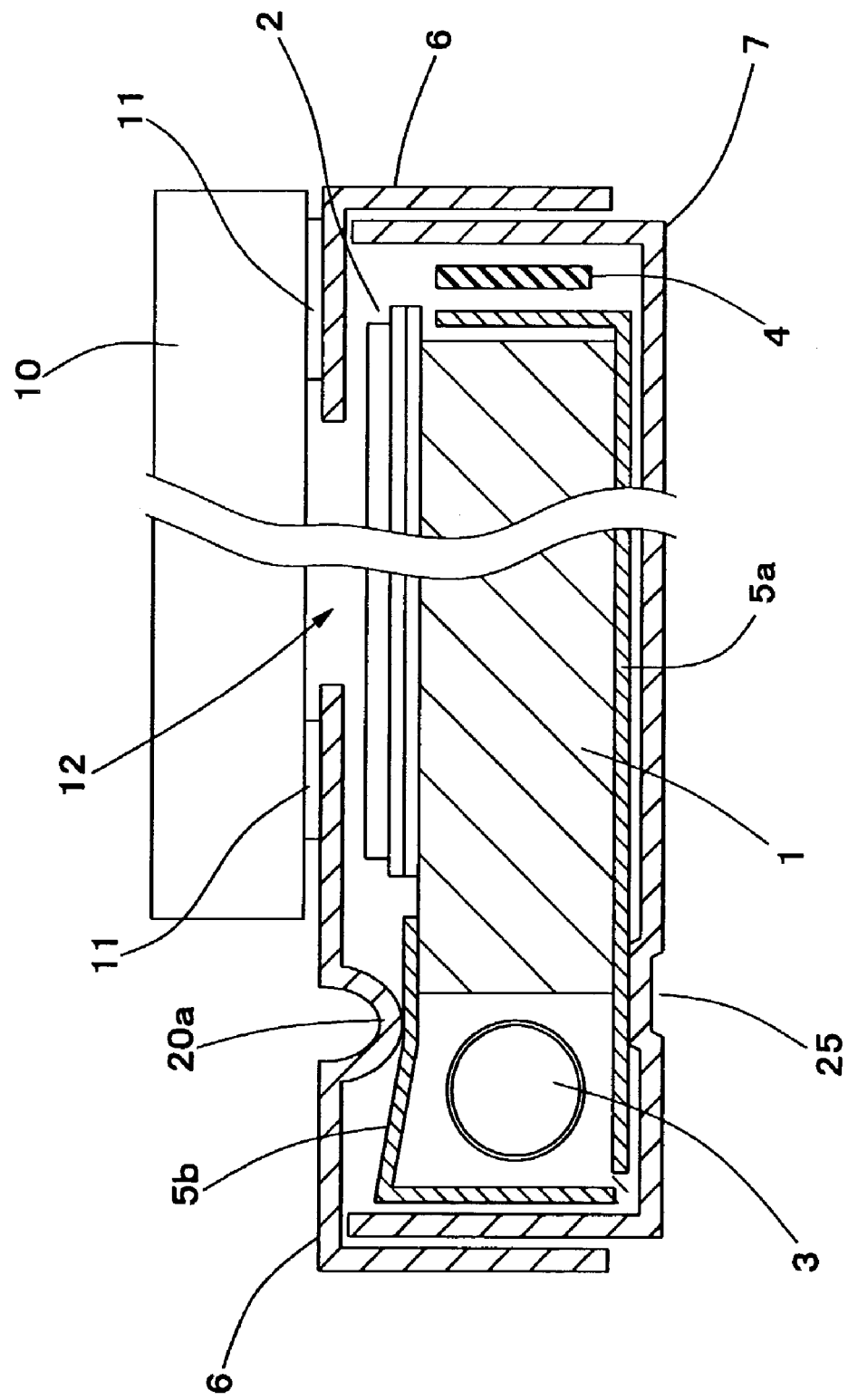
FIG. 17 is a sectional view showing an example construction of a panel light source device according to a seventh embodiment of the present invention.

FIG. 17 is a sectional view showing an example construction of a panel light source device according to a seventh embodiment of the present invention. In the figure, a numerical reference 1 indicates a light guide plate, 2 an optical sheet, 3 a light emitter, 4 a wire, 5a the first reflecting sheet, 5b the second reflecting sheet, 6 a front face case, 7 a rear face case and 20a and 25 reflecting sheet contact sections.

The reflecting sheets 5a and 5b are reflecting members reflecting a part of light escaping from a light guide path of the light emitted from the light emitter 3 back into the light guide path, similarly to the case of the reflecting sheet 5 of the sixth embodiment described above. The reflecting sheets 5a and 5b are members formed in a thin sheet, made of a material high in surface reflectance such as aluminum or a resin.

The first reflecting sheet 5a is disposed adjacent to the rear face on the rear face side of the light guide plate 1, covering all over the rear face thereof. An end of the first reflecting sheet 5a extends to as far as the rear face side of the light emitter 3. On the other hand, the other end thereof is bent upwardly in the shape of an erected letter L to becomes adjacent to a side face on the wire 4 side of the light guide plate 1.

The second reflecting sheet 5b is a sheet-like member bent in the sectional shape of a letter L with a top directed sideways, housed in the composite case and functions as a lamp collector reflecting light from the light emitter 3. The second reflecting sheet 5b is disposed so as to reach the front face of the light guide plate 1 starting from a side face thereof spaced apart outwardly from the light emitter 3 disposed adjacent to the light guide plate 1. That is, the light emitter 3 is wrapped by an end portion of the first reflecting sheet 5a and the second reflecting sheet 5b so as to enclose the light emitter 3 with a spacing kept therebetween.

An end portion of the second reflecting sheet 5b reaching the front face of the light guide plate 1 overlaps the front face of the light guide plate 1 to prevent emitting light from the light emitter 3 from escaping through a clearance between the light guide plate 1 and the second reflecting sheet 5b. Note that the end portion is disposed so as not to overlap the optical sheet 2.

FIG. 18 is a perspective view showing examples of the first reflecting sheet 5a and the second reflecting sheet 5b of FIG. 17. Second reflecting sheets 5b are disposed facing adjacent two sides of the first reflecting sheet 5a corresponding to respective arms of the light emitter 3 of the light emitter unit and adjacent two sides of the first reflecting sheet 5a facing wires 4 are bent in the shape of an elected letter L at end portions 36 and 37.

The reflecting sheet contact section 20a is a contact section formed on the front face of the front face case 6 so that the front face of the front face case 6 is brought into contact with the second reflecting sheet 5b housed in the composite case. The reflecting sheet contact section 20a is obtained by deep drawing part of the front face of the front face case 6 so as to be caused to retreat in the rear face direction during press working of the front face case 6 similarly to the case of the reflecting sheet contact section 20 of the sixth embodiment described above. In this case, the inner surface side becomes convex and the outer surface side becomes concave and when the light guide plate 1, the reflecting sheet 5b and others are housed in the rear face case 7 and the front face case 6 is engaged with the rear face case 7, the fore end of the convex portion is brought into contact with the reflecting sheet 5b on the second reflecting sheet 5b in the light emitter 3 side spaced apart outwardly from the light guide plate 1.

According to this embodiment, not only is the reflecting sheet contact section 25 provided on the rear face case 7 presses the first reflecting sheet 5a from the rear face side to the light guide plate 1 on the rear face side of the light guide plate 1, but the reflecting sheet contact section 20a provided on the front face case 6 presses the second reflecting sheets 5b from the front face side to the light guide plate 1 on the front face side of the light guide plate 1; therefore, it can be effectively prevented from occurring that clearances occur between the light guide plate 1 and the first reflecting sheet 5a in the neighborhood of the light emitter 3; and between the light guide plate 1 and the second reflecting sheets 5b.

Accordingly, it can be prevented that a luminance on the light emitting surface is reduced by leakage through clearances of emitting light from the light emitter 3. Furthermore, it can be prevented that light escaping from the clearances becomes stray light to appear on the light emitting surface and to cause luminance irregularity of a panel light source device, resulted in display irregularity of a liquid crystal display device.

Furthermore, since the second reflecting sheets 5b are separate from the first reflecting sheet 5a and no necessity arises for bending an end portion each into the shape of a Greek letter Π open sideways as is in the case of the reflecting sheet 5 of the sixth embodiment described above to dispose the light emitter 3 inside of the bent end portions, easy assembly is realized.

Note that while description is given of the case the front face case 6 is a metal case and the reflecting sheet contact section 20a is formed by deep drawing, the reflecting sheet contact section 20a may be formed by bending similarly to the case of the reflecting sheet contact section 21 in the second embodiment. In addition, it is allowed that the front face case 6 is a resin case instead of a metal case and the reflecting sheet contact section 20a is molded integrally therewith.

Description is given of the case where the reflecting sheet contact section 20a provided on the front face case 6 is located in the light emitter 3 side spaced apart outwardly from the light guide plate 1, the reflecting sheet contact section 20a may be brought into contact with the second reflecting sheet 5b on the light guide plate 1.

Note that while description is given of a liquid crystal display device in each of the above embodiments, no specific limitation is imposed on a liquid crystal display device as a display device according to the present invention. Furthermore, a panel light source device according to the present invention is not limited to a device for use in a liquid crystal display device, but may be used in various kinds of applications and apparatuses as a slim light source device.

As described above in each of the above embodiments, a panel light source device according to the present invention is of a construction in which an end of a reflecting sheet provided facing the rear face of a light guide plate wraps a light emitter to then reach the front face of the light guide plate and part of a wall face or faces of the composite case housing the light guide plate, light emitter and the reflecting sheet or sheets are caused to protrude inwardly to be brought into contact with the reflecting sheet or sheets; therefore, it can be prevented from occurring or suppressed that a clearance or clearances occur between the reflecting sheet or sheets and the light guide plate, by pressing the reflecting sheet or sheets to the light guide plate.

With such constructions adopted, improvement can be achieved on a luminance on a light emitting surface and uniformity in luminance on the light emitting surface, or reduction is enabled in cost of production by omission of processing for absorbing light in an optical sheet. For this reason, there can be provided a high quality panel display device at a low cost.

With a construction in which a reflecting sheet or sheets are held by a reflecting sheet contact section or sections sandwiching therebetween, a movement of the reflecting sheet or sheets in the composite case can be suppressed; therefore, it can be prevented from occurring or suppressed that a clearance or clearances occur between the reflecting sheet or sheets and a light guide plate.

Moreover, with a construction in which a reflecting sheet contact section or sections are brought into contact with a reflecting sheet or sheets, an external force imposed on the composite case is hard to be transmitted to an optical sheet to thereby enable degradation in quality to be otherwise caused by a pressure to be prevented from occurring. Especially, in a liquid crystal display device, reduction in display quality due to mounting of a display panel can be prevented from occurring.

Furthermore, with use of the panel light source device as a light source in a display device according to the present invention, a high quality display device can be provided at a low cost.

The entire disclosure of two Japanese Patent Application No. 2002-079165 (filed on May 20, 2002) and No. 2002-222965 (filed on Jul. 31, 2002) respectively including specification, claims, drawings and summary, on which the Convention priority of the present application is based, are incorporated herein by reference in its entirety.

What is claimed is:

1. A panel light source device comprising;
a light guide plate having a front face, a rear face, a first side face and a second side face opposite to said first side face;
an optical sheet provided adjacent said front face of the light guide plate;
a light emitter arranged to cause light to enter said first side face of the light guide plate;
a reflecting sheet, provided facing said rear face of the light guide plate to cover all over said rear face of the light guide plate, a first end of which sheet extends around the light emitter to reach said front face of the light guide plate, and a second end of which sheet is provided oppositely to said second side face of the light guide plate; and
a case, at least partly surrounding the light guide plate, the light emitter and the reflecting sheet, said case being constituted of a front face case and a rear face case engaged with the front face case; and
a reflecting sheet contact section extending from a wall of the case toward an interior of the case, to come into contact with said reflecting sheet at points laterally spaced from the light guide plate, to thereby sandwich a peripheral portion of said reflecting sheet between said reflecting sheet contact section and said light guide plate, and to prevent creation of any clearance between said reflecting sheet and said light guide plate.

2. The panel light source device according to claim 1, wherein the reflecting sheet contact section is provided on a rear face of the case.

3. The panel light source device according to claim 1, wherein
the case is a metal case obtained by press working, and the reflecting sheet contact section is formed by deep drawing.

4. The panel light source device according to claim 1, wherein
the case is a metal case obtained by press working, and the reflecting sheet contact section is formed by bending.

5. The panel light source device according to claim 1, wherein
the case is a resin case, and the reflecting sheet contact section is integrally molded onto an inner surface of the case.

6. The panel light source device according to claim 1, wherein
the light emitter is a linear light source, and
the reflecting sheet contact section extends in the same direction as the linear light source and is brought into contact with the reflecting sheet in a linear region.

7. A panel light source device comprising:
a light guide plate having a front face, a rear face, a first side face and a second side face opposite to said first side face;
an optical sheet provided adjacent said front face of the light guide plate;
a light emitter arranged to cause light to enter said first side face of the light guide plate;
a reflecting sheet, provided facing said rear face of the light guide plate to cover all over said rear face of the light guide plate,
a first end of which sheet extends around the light emitter to reach said front of the light guide plate, and a second end of which sheet is provided oppositely to said second side face of the light guide plate; and
a case, at least partly surrounding the light guide plate, the light emitter and the reflecting sheet, said case being constituted of a front face case and a rear face case engaged with the front face case; and
a reflecting sheet contact section extending from a wall of the case toward an interior of the case, to come into contact with paid reflecting sheet by engagement of said front face case and said rear face case, and
wherein a plurality of reflecting sheet contact sections are provided on the front face and rear face of the case.

8. A panel light source device comprising:
a light guide plate having a front face, a rear face, a first side face and a second side face opposite to first side face;
an optical sheet provided adjacent said fronts face of the light guide plate;
a light emitter arranged adjacent the light guide plate to cause light to enter said first side face of the light guide plate;
a reflecting sheet, including a first reflecting sheet, provided facing said rear face of the light guide plate to cover all over said rear face of the light guide plate; a first end of which first reflecting sheet extends as far as a rear face side of the light emitter, and a second reflecting sheet, being bent in a sectional shape of a letter L, and extending around the light emitter to reach the front face of the light guide plate; and
a case, at least partly surrounding the light guide plate, the light emitter and the reflecting sheet; and
a reflecting sheet contact section extending from a wall of the case toward an interior of the case, to come into contact with the reflecting sheet.

9. A display device comprising:
a light guide plate having a front face, a rear face, a first side face and a second side face opposite to said first side face;
an optical sheet provided adjacent said front face of the light guide plate;

a light emitter arranged adjacent the light guide plate to cause light to enter said first side face of the light guide plate;

a reflecting sheet, provided facing said rear face of the light guide plate to cover all over said rear face of the light guide plate, a first end of which sheet extends around the light emitter to reach said front face of the light guide plate, and a second end of which sheet is provided oppositely to said second side face of the light guide plate and a light source device case, at least partly surrounding the light guide plate, the light emitter and the reflecting sheet, said light source device case being constituted of a front face case and a rear face case engaged with the front face case, said light source device case including an opening on a front face of said light source device case;

a reflecting sheet contact section causing part of said front face case, at the light emitter side farther than the opening, to recede toward said rear face case, to come into contact with the reflecting sheet; and a display panel provided, facing the opening of the light source device case.

10. The display device according to claim 9, wherein the light emitter is a linear light source, and the reflecting sheet contact section extends along an end portion of the opening, along which the light emitter is provided, and is brought into contact with the reflecting sheet in a linear region.

11. A display device comprising a light guide plate having a front face, a rear, face and a side face;

an optical sheet provided adjacent said front face of the light guide plate;

a light emitter arranged adjacent the light guide plate to cause light to enter said side face of the light guide plate;

a reflecting sheet, provided facing said rear face of the light guide plate, and an end of which sheet extends around the light emitter to reach said front face of the light guide plate;

a light source device case, at least partly surrounding the light guide plate; the light emitter and the reflecting sheet, and including an opening, provided on a front face of said case;

a reflecting sheet contact section, causing part of said front face of said case, at the light emitter side farther than the opening, to recede toward the rear face side of said case, to come into contact with the reflecting sheet; and a display panel provided, facing the opening of the light source device case;

wherein the reflecting sheet contact section is provided on a light source device case at an outer side spaced apart from a mounting position of the display panel.

* * * * *

UNITED STATES PATENT AND TRADEMARK OFFICE
CERTIFICATE OF CORRECTION

PATENT NO.        : 6,962,430 B2
APPLICATION NO. : 10/392040
DATED             : November 8, 2005
INVENTOR(S)       : Atsushi Ito and Masayuki Kawano It is certified that error appears in the above-identified patent and that said Letters Patent is hereby corrected as shown below:

Column 17,
Line 28, ";" should be -- : --.

Column 18,
Line 43, "fronts" should be -- front --.

Column 19,
Line 10, after "plate" insert -- ; --.

Column 20,
Line 2, after "rear" delete ",".
Line 14, ";" should be -- , --.
Line 15, after "opening" delete ",".

Signed and Sealed this

Twentieth Day of June, 2006

JON W. DUDAS
*Director of the United States Patent and Trademark Office*